United States Patent
Hokuto et al.

(10) Patent No.: US 11,028,789 B2
(45) Date of Patent: Jun. 8, 2021

(54) ACTUATOR

(71) Applicant: DENSO CORPORATION, Kariya (JP)

(72) Inventors: Daisuke Hokuto, Kariya (JP); Tetsuji Yamanaka, Kariya (JP); Kunio Namba, Kariya (JP); Atsushi Tanaka, Kariya (JP); Etsugo Yanagida, Kariya (JP); Naoaki Kono, Kariya (JP); Masashi Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/736,247

(22) Filed: Jan. 7, 2020

(65) Prior Publication Data
US 2020/0217256 A1 Jul. 9, 2020

(30) Foreign Application Priority Data
Jan. 9, 2019 (JP) .............................. JP2019-001511

(51) Int. Cl.
*F02D 41/00* (2006.01)
*F16K 31/04* (2006.01)
*F02B 37/22* (2006.01)
*F16K 37/00* (2006.01)

(52) U.S. Cl.
CPC .......... *F02D 41/0007* (2013.01); *F02B 37/22* (2013.01); *F02D 41/0077* (2013.01); *F16K 31/047* (2013.01); *F16K 37/0041* (2013.01)

(58) Field of Classification Search
CPC ............... F02D 41/0007; F16K 31/047; F16K 37/0041; F16K 37/0033; F16K 31/535; F02B 37/22; F02B 37/186; F02B 37/183; F16H 2055/065; F16H 1/22; F16H 55/17; F16H 55/06; F16C 3/02; H02K 7/116
See application file for complete search history.

(56) References Cited

U.S. PATENT DOCUMENTS

2018/0187791 A1  7/2018  Yamanaka et al.

OTHER PUBLICATIONS

U.S. Appl. No. 16/736,210, filed Jan. 7, 2020, Actuator.
U.S. Appl. No. 16/736,182, filed Jan. 7, 2020, Actuator.
U.S. Appl. No. 16/736,247, filed Jan. 7, 2020, Actuator.
U.S. Appl. No. 16/736,210 to Yamaguchi et al., entitled "Actuator", filed Jan. 7, 2020 (71 pages).
U.S. Appl. No. 16/736,182 to Yamaguchi et al., entitled "Actuator", filed Jan. 7, 2020 (36 pages).

*Primary Examiner* — Audrey K Bradley
*Assistant Examiner* — Edward Bushard
(74) *Attorney, Agent, or Firm* — Nixon & Vanderhye P.C.

(57) ABSTRACT

An output gear includes a fixing portion, which is joined to a surface-processed portion of an output shaft, and a connecting portion that connects between a toothed portion of the output gear and the fixing portion. A length, which is measured from a center of a boundary surface between the connecting portion and the fixing portion in an axial direction of an axis of the output shaft to one end part of a joint between the surface-processed portion and the fixing portion on a linkage mechanism side along the joint, is indicated by L1. A length, which is measured from the center of the boundary surface to an opposite end part of the joint that is opposite to the linkage mechanism in the axial direction, is indicated by L2. A relationship of L1>L2 is satisfied.

11 Claims, 16 Drawing Sheets

ACTUATOR LEVER SIDE

ACTUATOR LEVER SIDE

FIG. 16

| CONFIGURATION | SURFACE AREA | STRESS |
|---|---|---|
| SURFACE-PROCESSED PORTION FORMED CONTINUOUSLY | LARGE | SMALL |
| SURFACE-PROCESSED PORTIONS FORMED AT PLURALITY OF LOCATIONS | SMALL | LARGE |

US 11,028,789 B2

ACTUATOR

CROSS REFERENCE TO RELATED APPLICATION

This application is based on and incorporates herein by reference Japanese Patent Application No. 2019-001511 filed on Jan. 9, 2019.

TECHNICAL FIELD

The present disclosure relates to an actuator.

BACKGROUND

There has been proposed an actuator for a turbocharger. The actuator reduces a speed of rotation outputted from an electric motor through a speed reducer and thereafter outputs the rotation through an output shaft.

SUMMARY

This section provides a general summary of the disclosure, and is not a comprehensive disclosure of its full scope or all of its features.

According to the present disclosure, there is provided an actuator configured to drive a boost pressure control valve of a supercharger. The actuator includes an electric motor; an output shaft that is coupled to the boost pressure control valve through a linkage mechanism; and a speed reducer that is configured to transmit rotation, which is outputted from the electric motor, to the output shaft after reducing a speed of the rotation outputted from the electric motor. The speed reducer has a plurality of gears that include an output gear joined to the output shaft. The output shaft is made of metal. The output gear is made of resin. The output shaft has a surface-processed portion that has a series of projections and recesses and is formed at a portion of an outer peripheral surface of the output shaft.

BRIEF DESCRIPTION OF THE DRAWINGS

The drawings described herein are for illustrative purposes only of selected embodiments and not all possible implementations, and are not intended to limit the scope of the present disclosure.

FIG. 16 is a descriptive diagram showing a comparison of lengths of the surface-processed portion of the output shaft according to a sixth embodiment.

DETAILED DESCRIPTION

Figure 1:
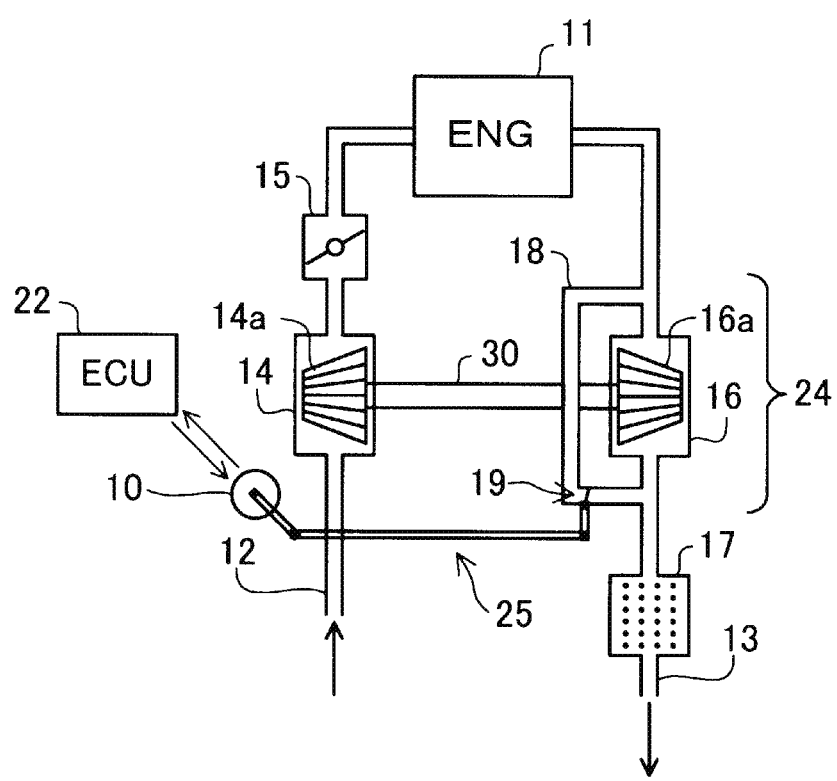
FIG. 1 is a schematic diagram of an intake and exhaust system of an internal combustion engine, to which an actuator of a first embodiment is applied.

There has been proposed an actuator for a turbocharger. The actuator reduces a speed of rotation outputted from an electric motor through a speed reducer and thereafter outputs the rotation through an output shaft. A rotational angle of the output shaft is sensed with a contactless rotational angle sensor that includes a magnetic circuit device and a sensing device. An output gear of the speed reducer is made of resin that is integrally fixed to the output shaft made of metal, and the magnetic circuit device is insert molded in the resin of the output gear.

When the above actuator is used for an engine, which generates a large pulsation of exhaust gas, or a supercharger, which includes a wastegate valve having a large port diameter, a load, which is caused by the pulsation of the exhaust gas, is increased, and this load is applied from a rod to the output gear through a lever and the output shaft. The output gear receives an operational load from the electric motor through the speed reducer. As a result, a large torsion torque is generated at a joint between the output shaft and the output gear. When the large torsion torque is generated, the fixation of the joint between the output shaft and the output gear cannot be maintained, and thereby slipping occurs between the output shaft and the output gear. In such a case, the output of the magnetic circuit at the time of occurrence of the slipping between the output shaft and the output gear does not coincide with the output of the magnetic circuit at the time of absence of the slipping between the output shaft and the output gear. Therefore, the sensing accuracy of the rotational angle of the output shaft may be deteriorated, and thereby the control accuracy of the opening degree of the wastegate valve may possibly be deteriorated.

According to one aspect of the present disclosure, there is provided an actuator configured to drive a boost pressure control valve of a supercharger. The actuator includes: an electric motor; an output shaft that is coupled to the boost pressure control valve through a linkage mechanism; and a speed reducer that is configured to transmit rotation, which is outputted from the electric motor, to the output shaft after reducing a speed of the rotation outputted from the electric motor. The speed reducer has a plurality of gears that include an output gear joined to the output shaft. The output shaft is made of metal. The output gear is made of resin. The output shaft has a surface-processed portion that has a series of projections and recesses and is formed at a portion of an outer peripheral surface of the output shaft. The output gear includes: a fixing portion that is joined to the surface-processed portion; a connecting portion that connects between a toothed portion of the output gear and the fixing portion with the resin while the toothed portion includes a plurality of teeth; and a magnetic circuit device that is provided to sense a rotational position of the output gear. A length, which is measured from a center of a boundary surface between the connecting portion and the fixing portion in an axial direction of an axis of the output shaft to one end part of a joint between the surface-processed portion and the fixing portion on the linkage mechanism side along the joint, is indicated by L1. A length, which is measured along the joint from the center of the boundary surface to an opposite end part of the joint that is opposite to the linkage mechanism in the axial direction of the axis of the output shaft, is indicated by L2. A relationship of L1>L2 is satisfied. The torsion torque between the output gear and the output shaft is strongly applied to a region of the surface-processed portion, which is from the location of the center of the connecting portion centered in the axial direction of the axis of the output shaft to the one end part of the surface-processed portion located on the lever side, i.e., the linkage mechanism side. According to the above aspect of the present disclosure, the length, which is measured from the center of the connecting portion to the one end part of the surface-processed portion on the lever side is indicated by L1, and the length, which is measured from the center of the connecting portion to the opposite end part of the surface-processed portion that is opposite to the lever, is indicated by L2. Furthermore, the relationship of L1>L2 is satisfied. Therefore, in comparison to a case where a relationship of L1≤L2 is satisfied, it is possible to reduce the stress at the region of the surface-processed portion, at which the stress caused by the torsion torque is applied. Thus, it is possible to limit slipping between the output shaft and the output gear caused by the torsion torque. Therefore, the sensing accuracy of the rotational angle of the output shaft may not be deteriorated.

Now, embodiments of the present disclosure will be described with reference to the accompanying drawings.

First Embodiment

As shown in FIG. 1, an actuator 10 of a first embodiment is applied to an internal combustion engine (hereinafter simply referred to as an engine) 11 that is a drive source for driving a vehicle.

The engine 11 has an intake passage 12, which conducts the air to cylinders of the engine 11, and an exhaust passage 13, which discharges an exhaust gas generated at the cylinders to the atmosphere. A compressor wheel 14a of an intake compressor 14 of a supercharger 24 and a throttle valve 15 are installed in the intake passage 12. The compressor wheel 14a supercharges the air to the engine 11. The throttle valve 15 adjusts the amount of intake air supplied to the engine 11 according to the amount of depression of an accelerator pedal (not shown) of the vehicle.

A turbine wheel 16a of an exhaust turbine 16 of the supercharger 24 and a catalyst 17 for purifying the exhaust gas are installed in the exhaust passage 13. The turbine wheel 16a is connected to the compressor wheel 14a through a rotatable shaft 30. Specifically, the turbine wheel 16a is rotated by the exhaust gas energy of the engine 11 to rotate the compressor wheel 14a. The catalyst 17 is a known three-way catalyst, which has a monolithic structure. When the temperature of the catalyst 17 is raised to an activation temperature by the exhaust gas, the catalyst 17 purifies harmful substances contained in the exhaust gas through oxidation and reduction.

A bypass passage 18 is formed at the exhaust passage 13 in parallel with the turbine wheel 16a to conduct the exhaust gas while bypassing the turbine wheel 16a. A wastegate valve 19, which is a boost pressure control valve, is installed in the bypass passage 18. When the wastegate valve 19 is opened, a portion of the exhaust gas outputted from the engine 11 is directly guided to the catalyst 17 through the bypass passage 18. The wastegate valve 19 is opened when the pressure of the exhaust gas outputted from the engine 11 is increased beyond a valve opening pressure of the wastegate valve 19. Furthermore, the opening and closing of the wastegate valve 19 is also controlled by an engine control unit (ECU) 22. Specifically, the ECU 22 drives the actuator 10 to open and close the wastegate valve 19 through a linkage mechanism 25 that is installed between the actuator 10 and the wastegate valve 19.

Figure 2:
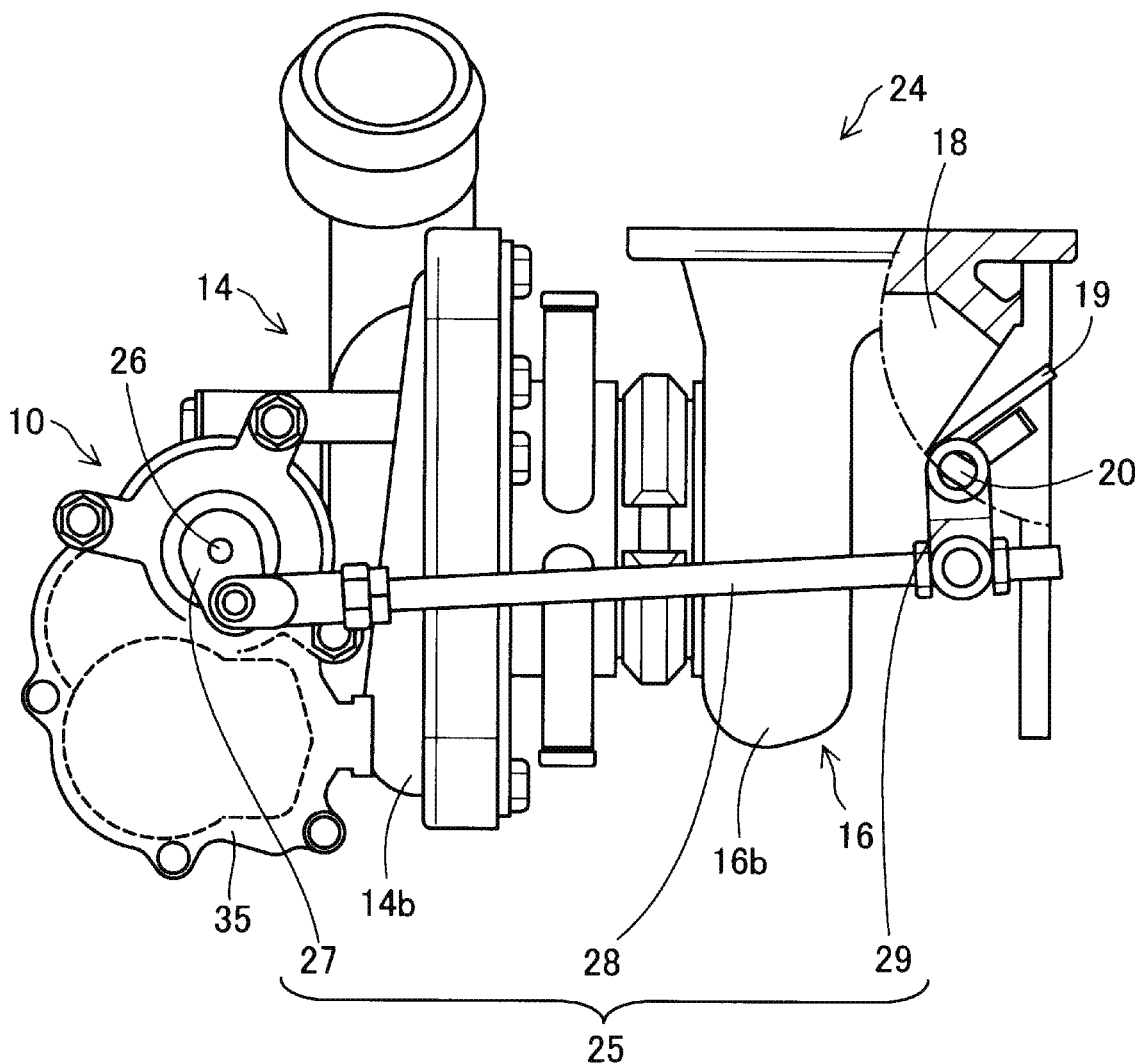
FIG. 2 is a descriptive diagram of a supercharger of the first embodiment.

As shown in FIG. 2, the supercharger 24 includes the exhaust turbine 16, the intake compressor 14 and the actuator 10. The exhaust turbine 16 includes the turbine wheel 16a (see FIG. 1), which is rotated by the exhaust gas outputted from the engine 11, and a turbine housing 16b, which is shaped in a spiral form and receives the turbine wheel 16a. The intake compressor 14 includes the compressor wheel 14a (see FIG. 1), which is rotated by the rotational force of the turbine wheel 16a, and a compressor housing 14b, which is shaped in a spiral form and receives the compressor wheel 14a. The turbine wheel 16a and the compressor wheel 14a are connected with each other by the rotatable shaft 30 (see FIG. 1).

Besides the turbine wheel 16a, the bypass passage 18 is provided at the turbine housing 16b. The bypass passage 18 directly conducts the exhaust gas, which enters the turbine housing 16b, to an exhaust gas outlet of the turbine housing 16b without supplying the exhaust gas to the turbine wheel 16a. The bypass passage 18 is opened and closed by the wastegate valve 19. The wastegate valve 19 is a swing valve that is rotatably supported by a valve shaft 20 at the inside of the turbine housing 16b. Although the wastegate valve 19 is opened when the pressure of the exhaust gas is increased beyond the valve opening pressure, the wastegate valve 19 can be opened and closed by the actuator 10.

A housing 35, which receives the actuator 10, is installed to the intake compressor 14 that is spaced from the exhaust turbine 16 of the supercharger 24. With this configuration, it is possible to avoid an influence of a heat of the exhaust gas. The supercharger 24 includes a linkage mechanism 25 (see FIG. 1) that transmits the output of the actuator 10 to the wastegate valve 19. In the present embodiment, the linkage mechanism 25 is a four-bar linkage mechanism that includes an actuator lever 27, a rod 28 and a valve lever 29. The actuator lever 27 is joined to the output shaft 26 of the actuator 10 and is rotated by the actuator 10. The valve lever 29 is joined to the valve shaft 20. The rod 28 transmits the rotational torque, which is applied to the actuator lever 27, to the valve lever 29.

The operation of the actuator 10 is controlled by the ECU 22 that has a microcomputer. Specifically, the ECU 22 controls the actuator 10 to adjust the opening degree of the wastegate valve 19 at the time of, for example, rotating the engine 11 at a high rotational speed to control the boost pressure of the supercharger 24. Furthermore, when the temperature of the catalyst 17 does not reach the activation temperature at, for example, the time immediately after cold start of the engine 11, the ECU 22 controls the actuator 10 to fully open the wastegate valve 19 to warm up the catalyst 17 with the exhaust gas. In this way, the high temperature exhaust gas, which has not lost its heat to the turbine wheel 16a, can be directly conducted to the catalyst 17, so that the catalyst 17 can be warmed up within a short period of time.

Figure 3:
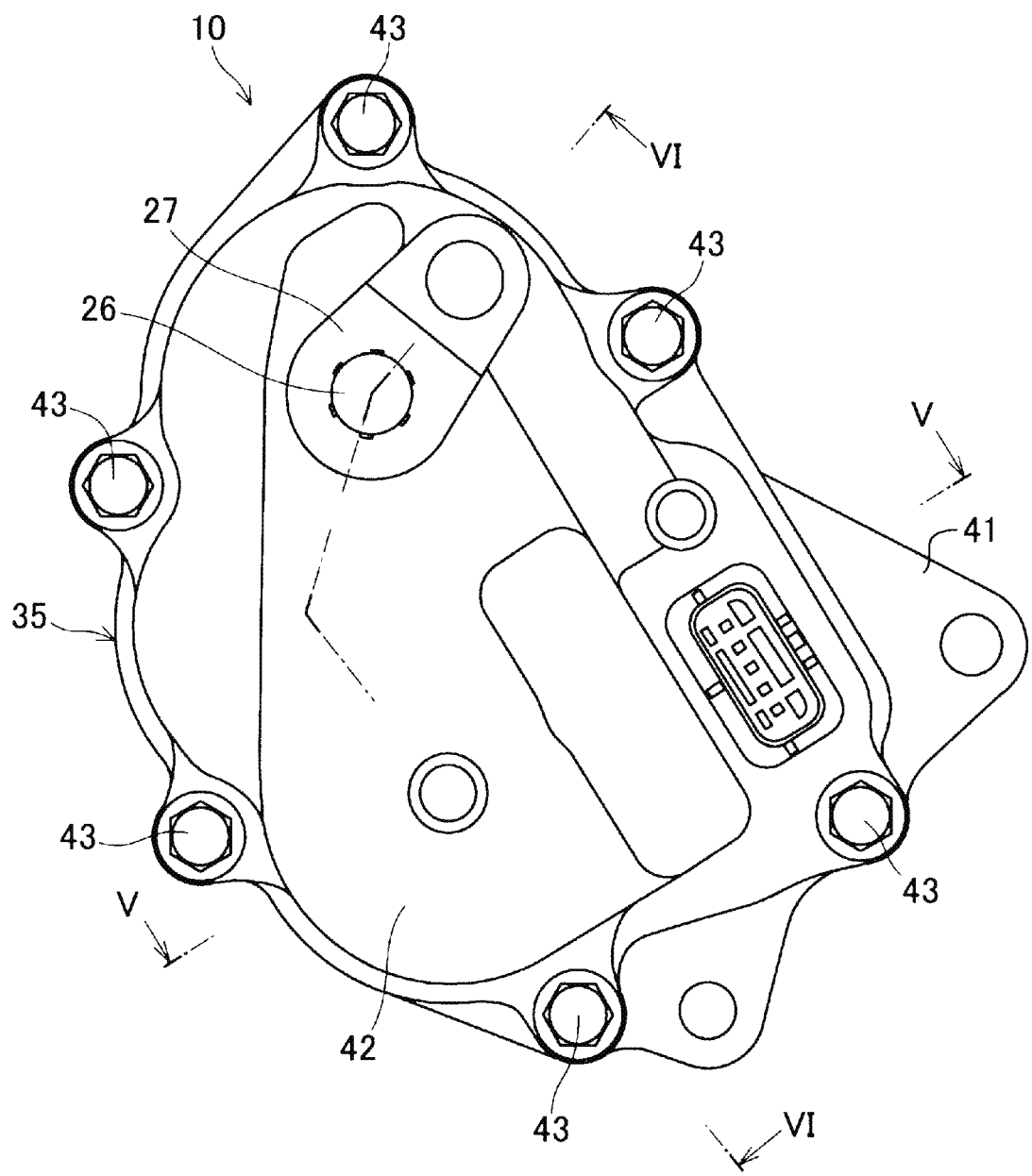
FIG. 3 is a plan view of the actuator of the first embodiment.

Next, the actuator 10 will be described with reference to FIGS. 3 to 6. The actuator 10 is received in the housing 35 that is installed to the intake compressor 14. As shown in FIG. 3, the housing 35 includes a first housing segment 41 and a second housing segment 42. The second housing segment 42 will be also referred to as a case 42. The first housing segment 41 and the second housing segment 42 are made of a metal material, such as aluminum, an aluminum alloy or iron steel. Alternatively, the first housing segment 41 and the second housing segment 42 may be made of resin. Furthermore, the first housing segment 41 and the second housing segment 42 may be formed by any manufacturing method among die casting, gravity casting, injection molding or press working. The second housing segment 42 is joined to the first housing segment 41 by fastening members 43. An output shaft 26 projects from the second housing segment 42 and is coupled to the actuator lever 27.

Figure 4:
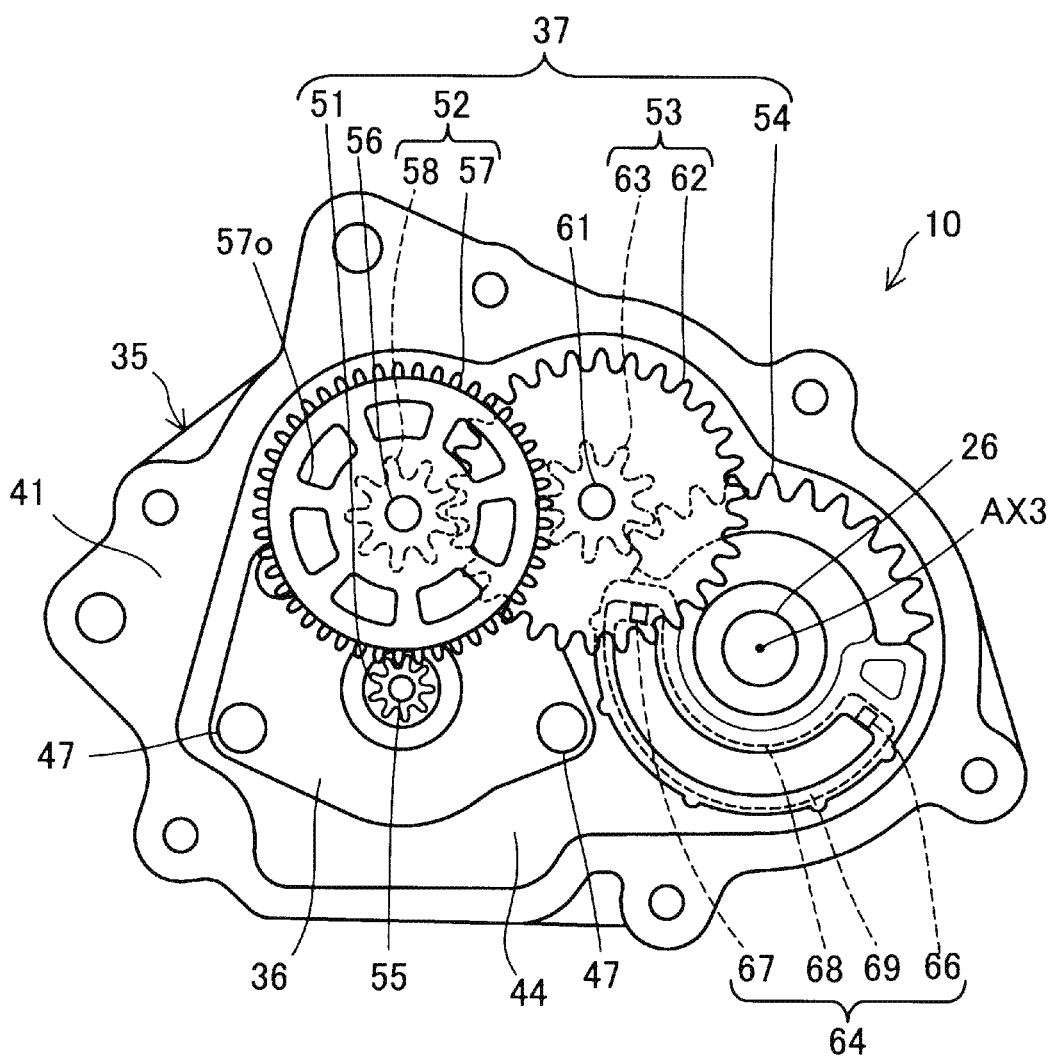
FIG. 4 is a descriptive diagram indicating respective gears of a speed reducer of the first embodiment.
Figure 5:
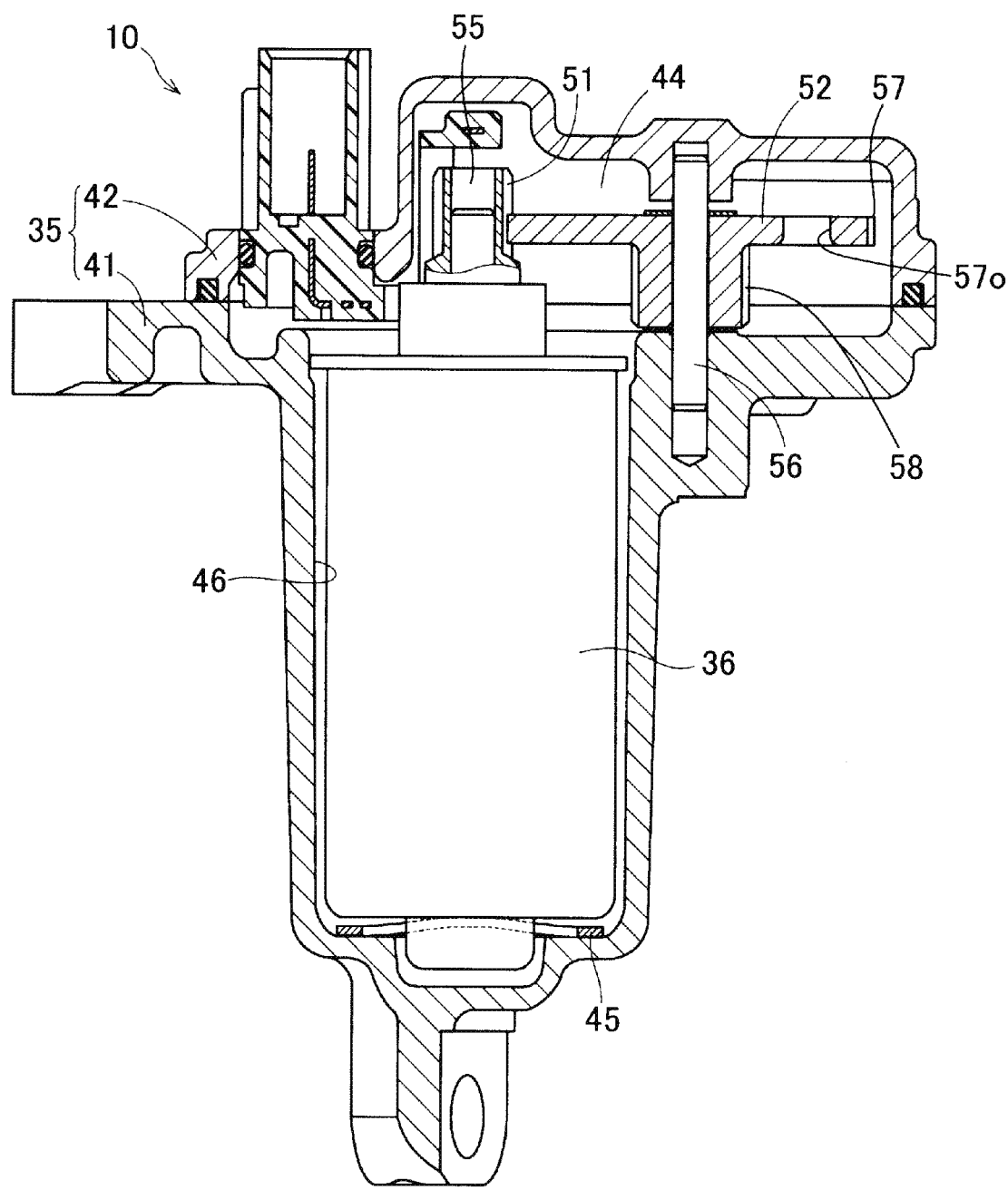
FIG. 5 is a cross-sectional view taken along line V-V in FIG. 3.

As shown in FIGS. 4 and 5, the first housing segment 41 and the second housing segment 42 cooperate together to form a receiving space 44 therein. The electric motor 36 is received in the receiving space 44. Specifically, the electric motor 36 is inserted into a motor insertion hole 46 formed at the first housing segment 41 and is fixed to the first housing segment 41 by screws 47. A wave washer 45 is installed between the electric motor 36 and a bottom surface of the motor insertion hole 46. The wave washer 45 may be eliminated if desired. The electric motor 36 may be any type of electric motor, such as a known DC motor, a known stepping motor or the like.

Figure 6:
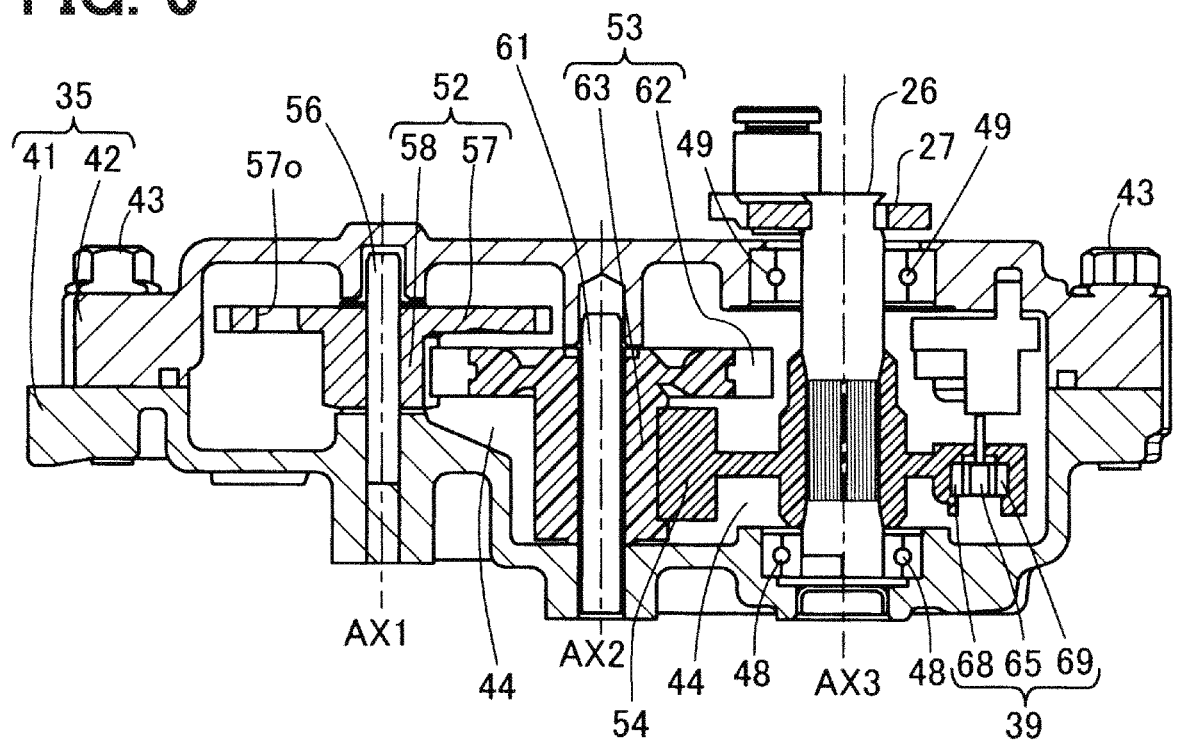
FIG. 6 is a cross-sectional view taken along line VI-VI in FIG. 3.

As shown in FIGS. 4 and 6, the actuator 10 includes the speed reducer 37. The speed reducer 37 is a parallel shaft speed reducer that reduces the speed of the rotation outputted from the electric motor 36 and transmits the rotation of the reduced speed to the output shaft 26. The speed reducer 37 includes a plurality of gears. In the present embodiment, the plurality of gears of the speed reducer 37 includes a pinion gear 51, a first intermediate gear 52, a second intermediate gear 53 and an output gear 54.

The pinion gear 51 is fixed to the motor shaft 55 of the electric motor 36. The pinion gear 51 is a metal gear made of metal. For example, iron-based sintered metal is used as this metal.

The first intermediate gear 52 is a compound gear that includes a first large diameter external gear 57 and a first small diameter external gear 58, and the first intermediate gear 52 is rotatably supported by a first metal shaft 56. The first large diameter external gear 57 is a large diameter gear (or simply referred to as a large gear) and is meshed with the pinion gear 51 that is fixed to the motor shaft 55 of the electric motor 36. The first small diameter external gear 58 is a small diameter gear (or simply referred to as a small gear) that has a diameter, which is smaller than that of the first large diameter external gear 57. The first large diameter external gear 57 and the first small diameter external gear 58 are metal gears made of metal. For example, iron-based sintered metal is used as this metal. The first large diameter external gear 57 has a plurality of openings 57o to reduce the inertia of the first large diameter external gear 57.

The second intermediate gear 53 is a compound gear that includes a second large diameter external gear 62 and a second small diameter external gear 63, and the second intermediate gear 53 is rotatably supported by a second metal shaft 61. The second large diameter external gear 62 is a large diameter gear and is meshed with the first small diameter external gear 58 of the first intermediate gear 52. The second large diameter external gear 62 is a metal gear made of metal. For example, iron-based sintered metal is used as this metal. The second small diameter external gear 63 is a small diameter gear that has a diameter smaller than that of the second large diameter external gear 62. Furthermore, the second small diameter external gear 63 is a resin gear that is made of resin. For example, polyamide resin, nylon resin or the polyacetal resin may be used as the resin. The resin gear has the smaller inertia in comparison to the metal gear. Therefore, in the case where the large impact load is applied to the second intermediate gear 53 by the pulsation of the exhaust gas pressure of the engine 11 through the wastegate valve 19, the valve lever 29, the rod 28, the actuator lever 27, the output shaft 26 and the output gear 54, it is possible to limit the transmission of this impact to the upstream side (motor side) gears, such as the first intermediate gear 52 and the pinion gear 51, which are located on the upstream side of the second intermediate gear 53.

The output gear 54 is meshed with the second small diameter external gear 63, and the output shaft 26 is coupled to and is fixed to the output gear 54 along a central axis AX3 of the output gear 54. The output gear 54 is a resin gear made of resin. Therefore, in the first embodiment, the pinion gear 51, the first large diameter external gear 57, the first small diameter external gear 58 and the second large diameter external gear 62, which are located at the upstream side in the transmission path between the electric motor 36 and the output shaft 26, are the metal gears, and the second small diameter external gear 63 and the output gear 54, which are located at the downstream side in the transmission path, are the resin gears. Specifically, among the gears of the speed reducer 37, the gears, which are other than the output gear 54 and the second small diameter external gear 63 of the second intermediate gear (compound gear) 53 meshed with the output gear 54, are the metal gears. Therefore, the meshing between the gears is limited to the meshing between the resin gears and the meshing between the metal gears, and there is no meshing between the resin gear and the metal gear. Thereby, it is possible to limit wearing of the resin gears.

As shown in FIGS. 5 and 6, the actuator 10 includes: the first housing segment (also simply referred to as a housing) 41, which receives the electric motor 36, the output shaft 26 and the speed reducer 37; and the second housing segment 42, which is also referred to as the case and is installed to the first housing segment 41 to cover the inside of the first housing segment 41. One end portion of the second metal shaft 61 is fixed to the first housing segment 41, and the other end portion of the second metal shaft 61 is supported by the second housing segment 42. Thus, in comparison to a case where the one end portion of the second metal shaft 61 is fixed to the first housing segment 41, and the other end portion of the second metal shaft 61 is not supported, it is possible to reduce or limit the tilting of the second metal shaft 61 that is caused by vibration and/or torque generated by the operation of the electric motor 36 and/or the pulsation transmitted from the wastegate valve 19.

Magnets (serving as magnetic flux generators) 66, 67 and yokes (serving as magnetic flux conductors) 68, 69 are installed to the output gear 54. The magnets 66, 67 and the yokes 68, 69 form a magnetic circuit device 64 that forms a closed magnetic circuit and is shaped in an arcuate form in a view taken in an axial direction of the axis of the output shaft 26. The magnetic circuit device 64 is rotated integrally with the output gear 54 and the output shaft 26.

A magnetic flux sensing device 65, which senses a magnetic flux generated from the magnets 66, 67, is installed at an inside of the closed magnetic circuit of the magnetic circuit device 64 of the output gear 54. For example, a Hall IC is used to form the magnetic flux sensing device 65. The magnetic circuit device 64 and the magnetic flux sensing device 65 function as a rotational angle sensor 39 that senses a rotational angle of the output shaft 26. The basic applications and functions of the magnetic circuit device 64 and the magnetic flux sensing device 65 are the same as those disclosed in JP2014-126548A (corresponding to US2014/0184204A, the disclosure of which is incorporated herein by reference in its entirety). The rotational angle of the output shaft 26, which is sensed with the rotational angle sensor 39, is outputted to the ECU 22 (see FIG. 1). The structures of the magnetic circuit device 64 and the magnetic flux sensing device 65 shown in FIG. 6 are only one example, and the magnetic circuit device 64 and the magnetic flux sensing device 65 may have another type of structures.

As shown in FIG. 6, the output shaft 26 is rotatably supported by a bearing 48, which is installed to the first housing segment 41, and a bearing 49, which is installed to the second housing segment 42. One end portion of the output shaft 26 outwardly projects from the second housing segment 42 of the housing 35. The actuator lever 27 is fixed to the output shaft 26 at the outside of the second housing segment 42.

Figure 7:
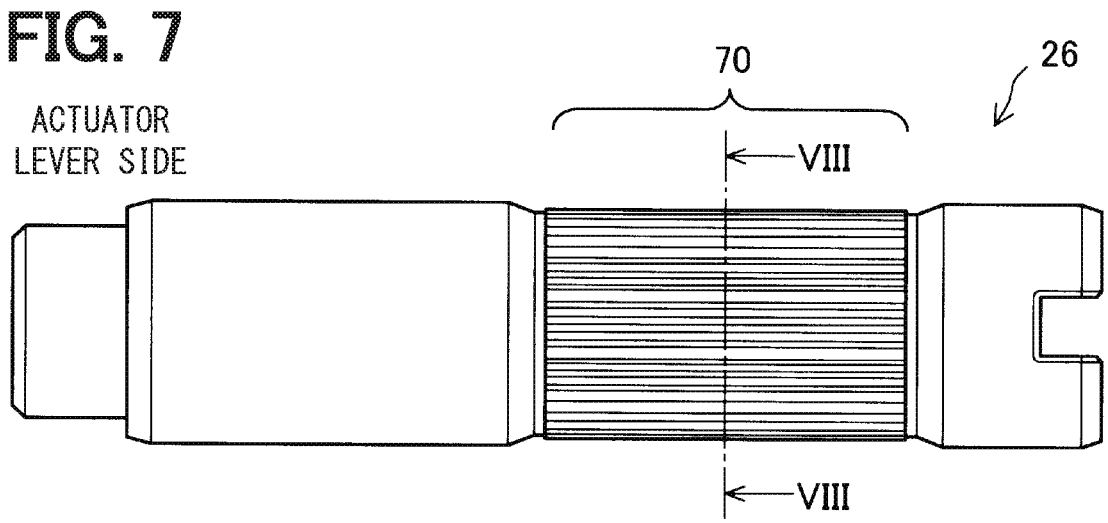
FIG. 7 is a side view of the output shaft.
Figure 8:
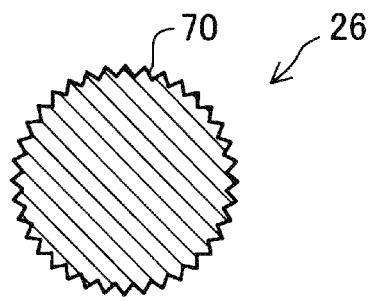
FIG. 8 is a cross-sectional view of a surface-processed portion, which is formed at the output shaft and has a series of projections and recesses.

As shown in FIG. 7 and FIG. 8 (a cross-sectional view taken along line VIII-VIII in FIG. 7), the output shaft 26 has a surface-processed portion 70 that has a series of projections and recesses. The surface-processed portion 70 is a portion of a surface of the output shaft 26, which is a cylindrical outer peripheral surface and is processed to have the series of projections and recesses. The configuration of the series of projections and recesses at the surface-processed portion 70 may be in a form of, for example: a straight knurl (linear knurl), which is parallel with the axial direction of the axis of the output shaft 26 shown in FIG. 7; a checkered knurl (diamond knurl); or a blast finish. A shape of the respective projections and recesses of the surface-processed portion 70 may be in a triangular form shown in FIG. 8 or another form, such as a rectangular form or a curved form. Specifically, as long as the series of projections and recesses are radially projected and recessed along a predetermined axial range of the output shaft 26, the configuration of the projections and recesses can be in any form.

Figure 9:
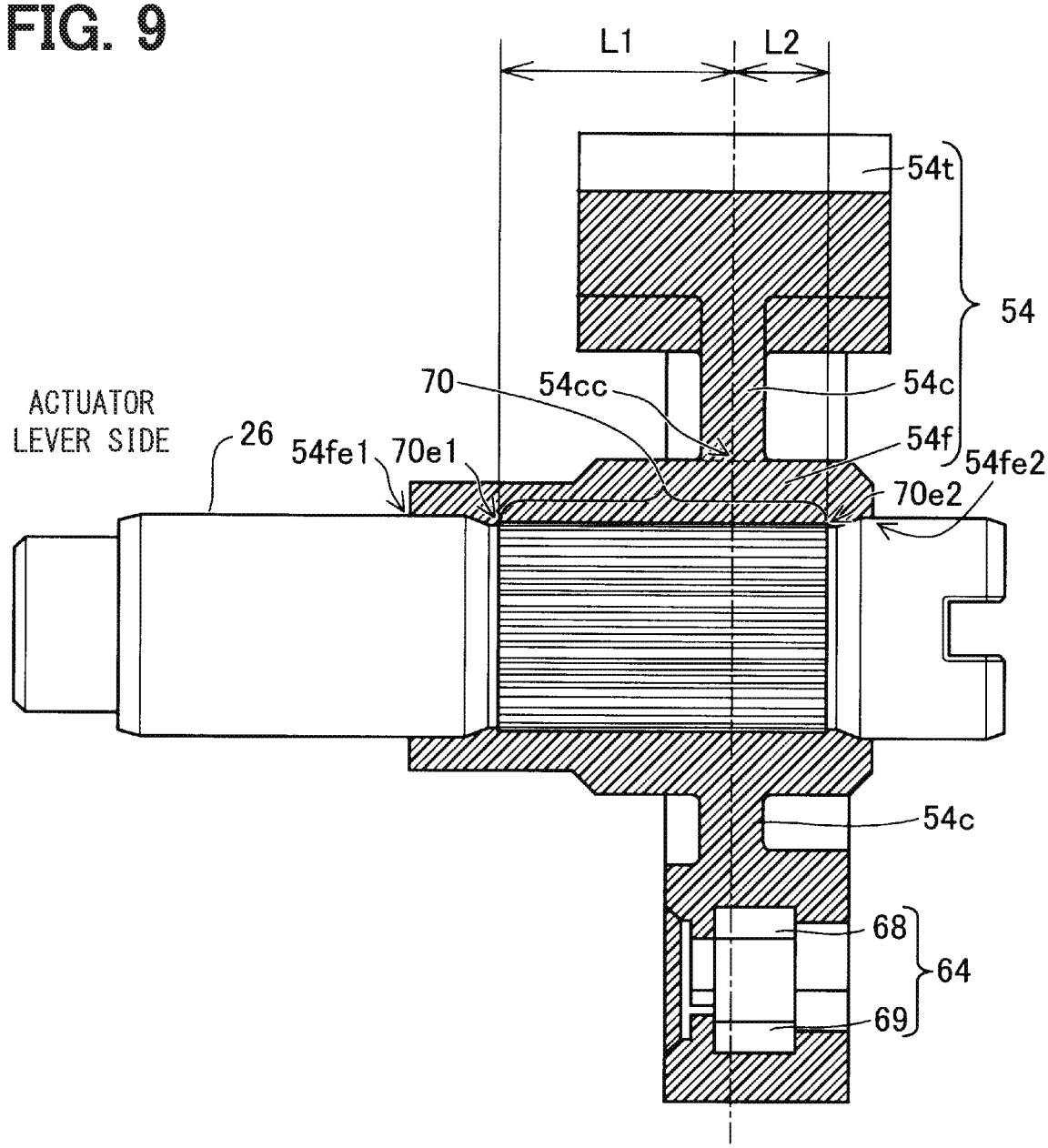
FIG. 9 is a descriptive diagram indicating the output shaft and the output gear.

The output gear 54 is made of resin and includes a fixing portion 54f, a connecting portion 54c and a toothed portion 54t, as shown in FIG. 9. The fixing portion 54f is located on a radially outer side of the surface-processed portion 70 of the output shaft 26 and fixes the output gear 54 to the output shaft 26. A plurality of teeth 54t1-54t11 of the toothed portion 54t is meshed with the teeth of the second small diameter external gear 63 of the second intermediate gear 53. The connecting portion 54c joins between the fixing portion 54f and the toothed portion 54t. Furthermore, the output gear 54 includes the magnetic circuit device 64. The magnetic circuit device 64 is placed on a side of the fixing portion 54f, which is opposite to the output shaft 26 in the radial direction. The magnetic circuit device 64 is connected to the fixing portion 54f through the connecting portion 54c.

In the first embodiment, as shown in FIG. 9, a length, which is measured from a center 54cc of a boundary surface between the connecting portion 54c and the fixing portion 54f in the axial direction of the axis of the output shaft 26 to one end part 70e1 of a joint between the surface-processed portion 70 and the fixing portion 54f on the actuator lever 27 side (i.e., the linkage mechanism 25 side) along the joint, is indicated by L1. Furthermore, a length, which is measured along the joint from the center 54cc of the boundary surface to an opposite end part 70e2 of the joint that is opposite to the actuator lever 27 (i.e., the linkage mechanism 25) in the axial direction of the axis of the output shaft 26, is indicated by L2. In such a case, a relationship of L1>L2 is satisfied. In FIG. 9, a length of the fixing portion 54f (a length from an end part 54fe1 to an end part 54fe2 of the fixing portion 54f) in the axial direction is larger than a length of the surface-processed portion 70 (a length from the end part 70e1 to the end part 70e2 of the surface-processed portion 70) in the axial direction. However, if the length of the surface-processed portion 70 (the length from the end part 70e1 to the end part 70e2 of the surface-processed portion 70) in the axial direction is larger than the length of the fixing portion 54f (the length from the end part 54fe1 to the end part 54fe2 of the fixing portion 54f) in the axial direction, the length L1 is from the center 54cc to the end part 54fe1 of the fixing portion 54f located on the actuator lever 27 side along the joint between the surface-processed portion 70 and the fixing portion 54f, and the length L2 is from the center 54cc to the end part 54fe2 of the fixing portion 54f located on the side opposite to the actuator lever 27 along the joint between the surface-processed portion 70 and the fixing portion 54f.

An operational load, which is applied from the electric motor 36 through the pinion gear 51, the first intermediate gear 52 and the second intermediate gear 53, and a pulsation load, which is caused by the pulsation of the exhaust gas of the engine 11 and is applied through the wastegate valve 19, the valve lever 29, the rod 28 and the actuator lever 27, are applied to the joint between the fixing portion 54f of the output gear 54 and the surface-processed portion 70 of the output shaft 26. Here, when a rotational direction of the output gear 54, which is rotated by the operational load, is different from a rotational direction of the output shaft 26, which is rotated by the pulsation load, a torsion torque is applied to the connection between the fixing portion 54f and the surface-processed portion 70. Here, the torsion torque, which is applied to the fixing portion 54f of the output gear 54, is larger at the actuator lever 27 side of the center 54cc of the connecting portion 54c (i.e., the center of the connecting portion 54c in the axial direction of the axis of the output shaft 26) in comparison to the opposite side of the center 54cc of the connecting portion 54c, which is opposite to the actuator lever 27. Therefore, when the relationship of L1>L2 is implemented, a stress, which is applied to the fixing portion 54f on the actuator lever 27 side of the center 54cc of the connecting portion 54c, can be reduced in comparison to a case where a relationship of L1≤L2 is implemented. Thus, it is possible to limit the slipping between the output shaft 26 and the output gear 54, which would be caused by the torsion torque, and thereby it is possible to limit deterioration in the sensing accuracy of the rotational angle of the output shaft 26.

Second Embodiment

Figure 10:
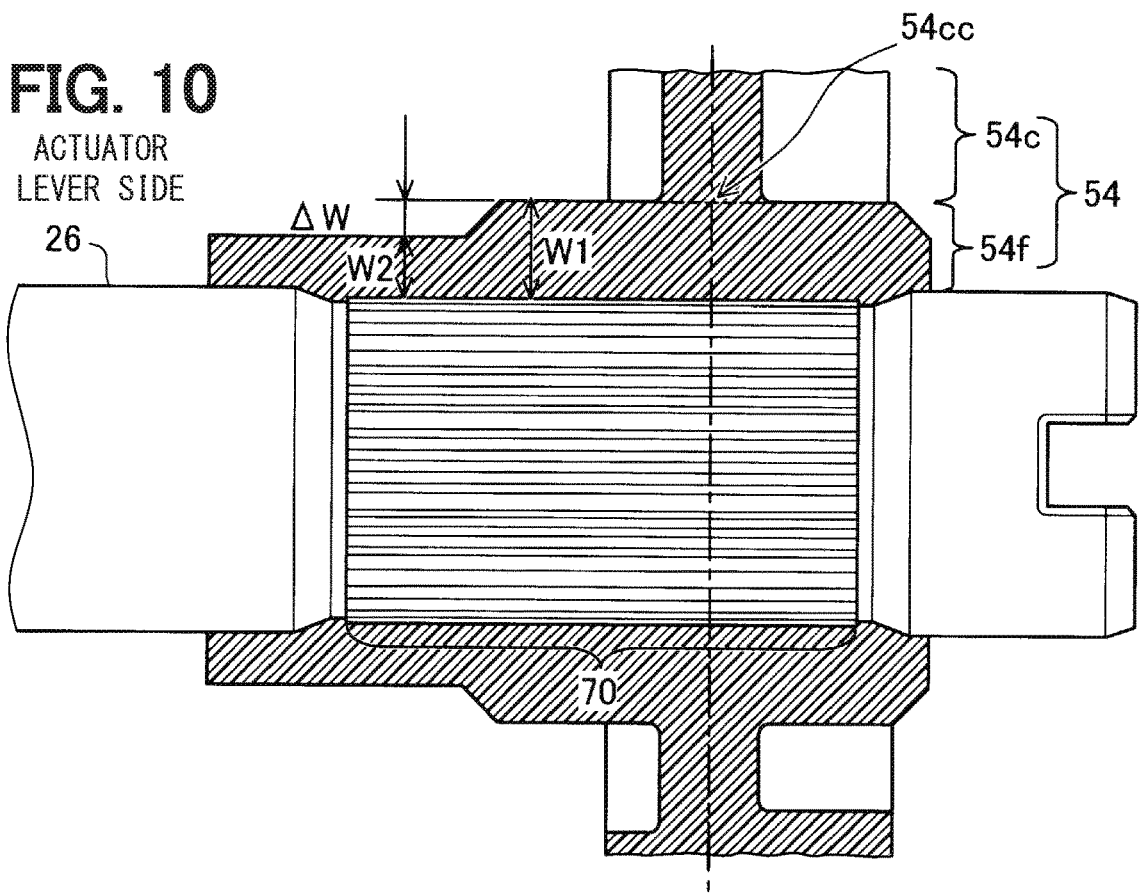
FIG. 10 is a magnified descriptive diagram indicating a joint between the output shaft and the output gear according to a second embodiment.

The actuator 10 of the second embodiment differs from the actuator 10 of the first embodiment with respect to the structure and the shape of the portion around the surface-processed portion 70. However, the rest of the actuator 10 of the second embodiment is the same as the actuator 10 of the first embodiment. This is also true for the actuator of the subsequent embodiments, which are subsequent to the second embodiment. As shown in FIG. 10, the fixing portion 54f has a stepped form where a radial thickness W2 of an end part of the fixing portion 54f, which is located on the actuator lever 27 side in the axial direction of the axis of the output shaft 26, is smaller than a radial thickness W1 of a center part of the fixing portion 54f, which is centered in the axial direction of the axis of the output shaft 26, by the amount ΔW. As can be understood in view of FIG. 6, the second large diameter external gear 62 of the second intermediate gear 53 is located on the actuator lever 27 side of the output gear 54. As in the second embodiment, in the case where the fixing portion 54f has the stepped form where the radial thickness W2 of the end part of the fixing portion 54f, which is located on the actuator lever 27 side in the axial direction of the axis of the output shaft 26, is smaller than the radial thickness W1 of a center part of the fixing portion 54f, which is centered in the axial direction of the axis of the output shaft 26, by the amount ΔW, it is possible to limit the interference between the fixing portion 54f and the second large diameter external gear 62 of the second intermediate gear 53 without increasing a size of the actuator 10 in the axial direction of the axis of the output shaft 26. Furthermore, the length L1 relative to the length L2 can be increased by increasing the length of the actuator lever 27 side part of the surface-processed portion 70 without increasing the size of the actuator 10 in the axial direction of the axis of the output shaft 26. Thus, the stress applied on the actuator lever 27 side of the center 54cc in the axial direction of the axis of the output shaft 26 can be further reduced. Here, it should be noted that the stepped form of the output gear 54 discussed above may not be used depending on a need.

Third Embodiment

Figure 11:
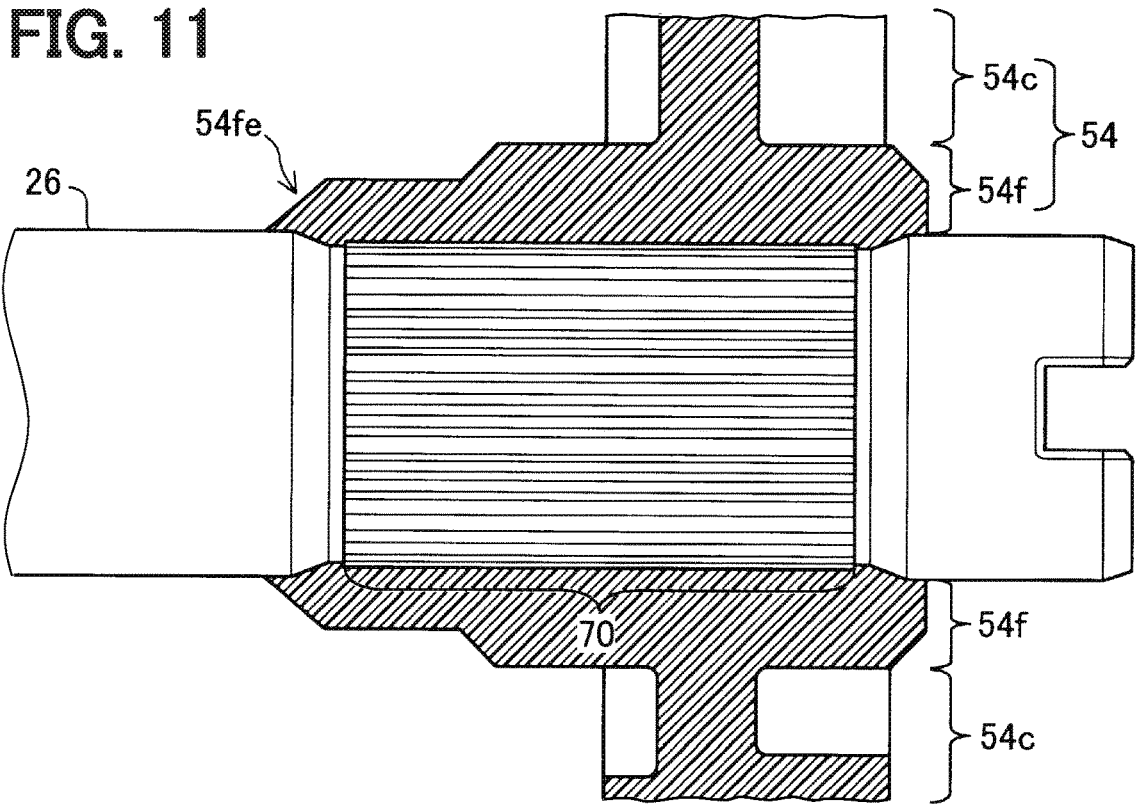
FIG. 11 is a magnified descriptive diagram indicating the joint between the output shaft and the output gear according to a third embodiment.

As shown in FIG. 11, the end part 54fe of the fixing portion 54f located on the actuator lever 27 side has a tapered form, a radial thickness of which is progressively reduced toward an end of the fixing portion 54f located on the actuator lever 27 side. By forming the end part 54fe of the fixing portion 54f, which is located on the actuator lever 27 side, in the tapered form, it is possible to reduce the amount of the resin used to form the fixing portion 54f. Furthermore, it is possible to reduce a damage of the fixing portion 54f at the time of applying a shock to a corner of the end part 54fe of the fixing portion 54f. Furthermore, the following advantage can be achieved at the time of forming the output gear 54 around the output shaft 26 through injection molding of resin.

Figure 12:
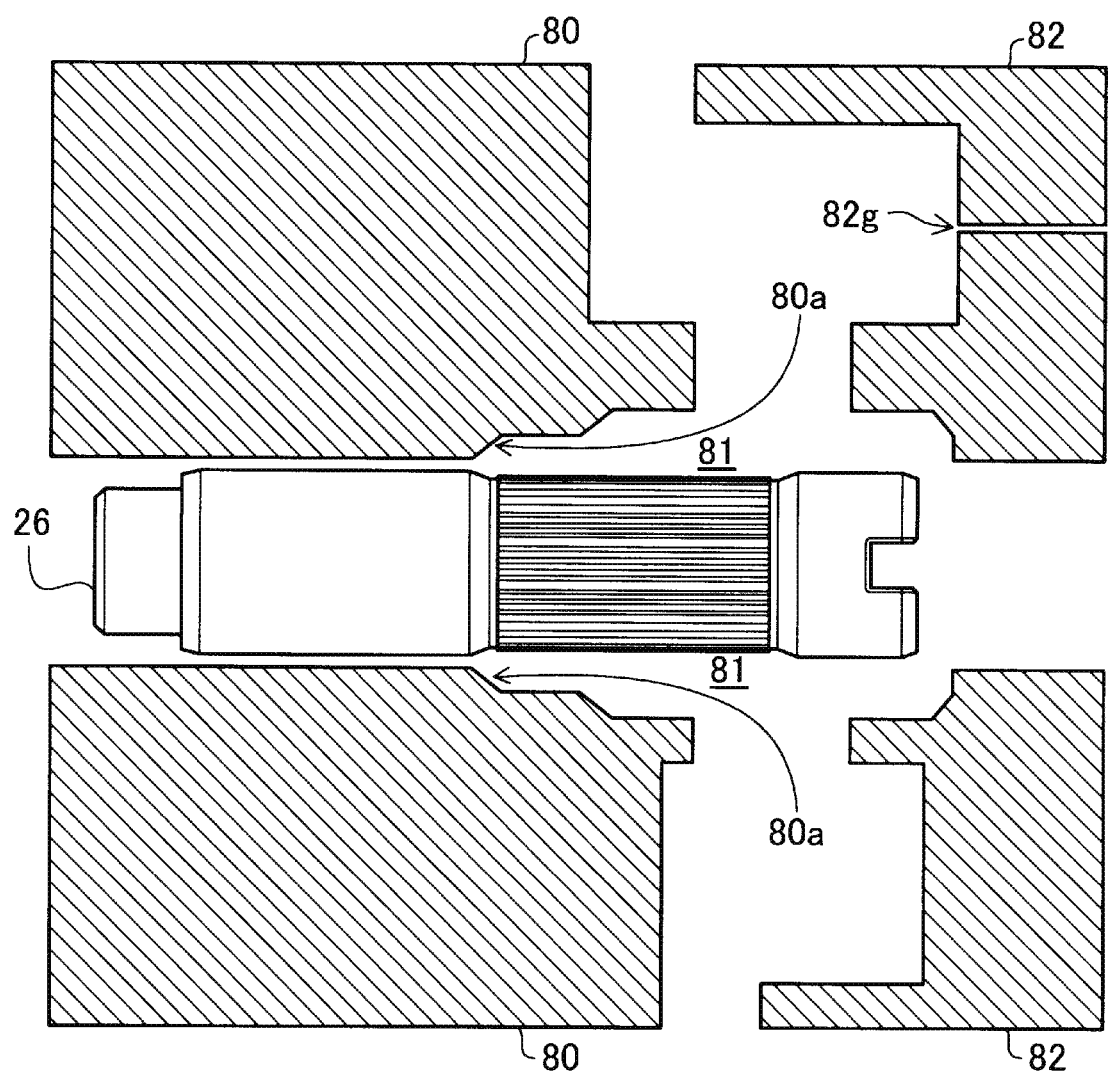
FIG. 12 is a descriptive diagram indicating the output shaft and molding dies for molding the output gear according to the third embodiment.

FIG. 12 shows the output shaft 26 and molding dies 80, 82 while the molding dies 80, 82 are used at the time of molding the output gear 54 around the output shaft 26. A cavity 81, into which the molten resin is filled, is formed between the molding die 80 and the molding die 82. The molding die 82 has a gate 82g, through which the molten resin is filled into the cavity 81. The output shaft 26 is placed in the cavity 81 such that the molding die 80 side of the output shaft 26 becomes the actuator lever 27 side of the output shaft 26. The molding die 80 has a mortar-shaped portion 80a at the actuator lever 27 side, i.e., an insertion side of the cavity 81 of the molding die 80 for inserting the output shaft 26 into the molding die 80. The mortar-shaped portion 80a corresponds to the tapered form of the end part 54fe of the fixing portion 54f located on the actuator lever 27 side. When the mortar-shaped portion 80a, which forms the tapered form of the end part 54fe, is formed at the molding die 80, the mortar-shaped portion 80a functions as a chamfered insertion opening of the molding die 80, through which the output shaft 26 is inserted into the molding die 80. Therefore, the output shaft 26 can be easily placed into the molding die 80. Furthermore, the output shaft 26 can be reliably placed in the molding die 80. The shape of the end part 54fe of the fixing portion 54f located on the actuator lever 27 side may not be in the tapered form. In such a case, the molding die 80 may not have the shape of the mortar-shaped portion 80a.

Fourth Embodiment

Figure 13:
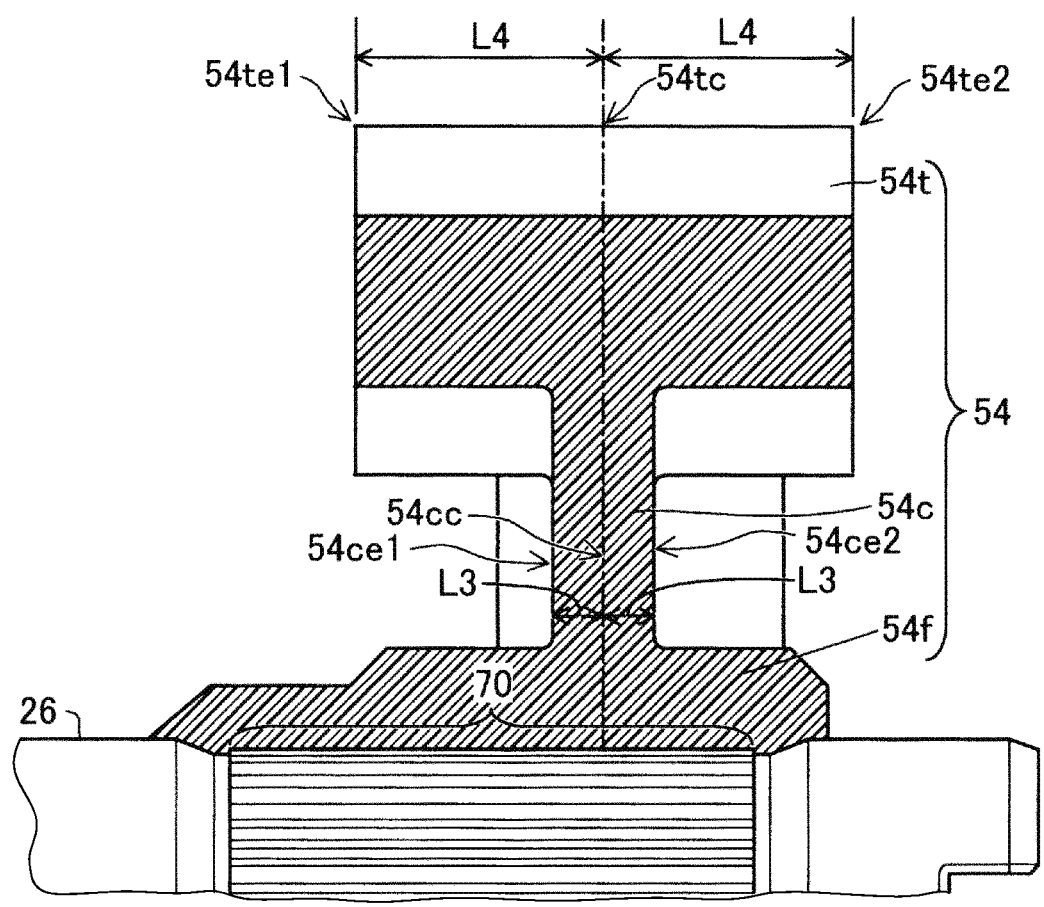
FIG. 13 is a magnified descriptive diagram indicating the joint between the output shaft and the output gear according to a fourth embodiment.

As shown in FIG. 13, a location of the center 54cc of the connecting portion 54c in the axial direction of the axis of the output shaft 26 and a location of a center 54tc of the toothed portion 54t of the output gear 54 in a widthwise direction of the toothed portion 54t of the output gear 54 that coincides with the axial direction of the axis of the output shaft 26 may be the same location in the axial direction of the axis of the output shaft 26. In FIG. 13, a distance L3 from one end part 54ce1 of the connecting portion 54c to the center 54cc in the axial direction of the axis of the output shaft 26 and a distance L3 from the other end part 54ce2 of the connecting portion 54c to the center 54cc are identical to each other, and a distance L4 from one end part 54te1 of the toothed portion 54t of the output gear 54 to the center 54tc in the axial direction of the axis of the output shaft 26 and a distance L4 from other end part 54te2 of the toothed portion 54t of the output gear 54 to the center 54tc in the axial direction of the axis of the output shaft 26 are identical to each other. Therefore, the center 54cc and the center 54tc are located at the same location in the axial direction of the axis of the output shaft 26. Furthermore, it can be said that the toothed portion 54t of the output gear 54 has the length L4 on the one side of the center 54cc and the length L4 on the other side of the center 54cc in the axial direction of the axis of the output shaft 26.

As in the fourth embodiment, in the case where the location of the center 54cc of the connecting portion 54c in the axial direction of the axis of the output shaft 26 and the location of the center 54*tc* of the toothed portion 54*t* of the output gear 54 in the widthwise direction of the toothed portion 54*t* are set to the same location in the axial direction of the axis of the output shaft 26, the force, which is applied to the connecting portion 54*c* at the actuator lever 27 side of the center 54*cc*, and the force, which is applied to the connecting portion 54*c* at the opposite side of the center 54*cc* opposite to the actuator lever 27, can be made substantially equal to each other. Therefore, it is possible to limit application of a moment, which causes tilting of the toothed portion 54*t* and the connecting portion 54*c*. That is, the toothed portion 54*t* and the connecting portion 54*c* can be hardly tilted.

Figure 14:
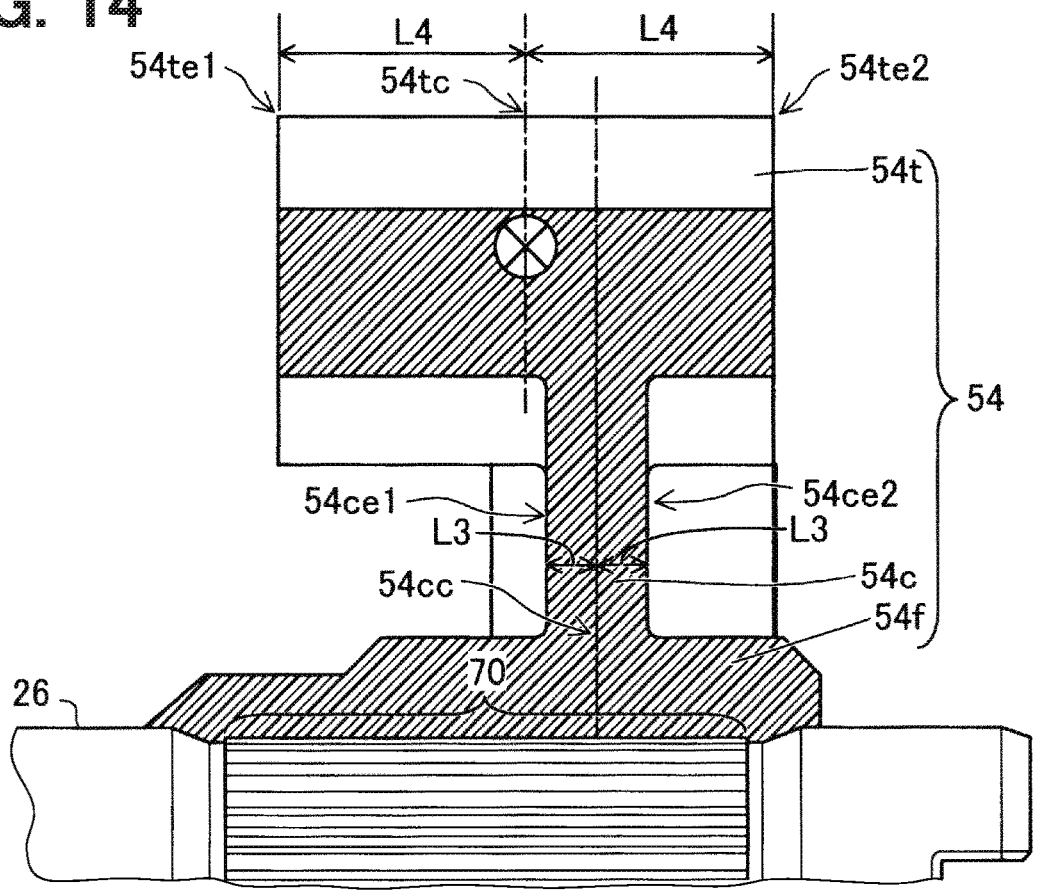
FIG. 14 is a magnified descriptive diagram indicating the joint between the output shaft and the output gear in a modification of the fourth embodiment.

In a modification of the fourth embodiment shown in FIG. 14, the center 54*tc* of the toothed portion 54*t* in the widthwise direction of the toothed portion 54*t* is slightly displaced toward the actuator lever 27 side, and thereby the location of the center 54*cc* of the connecting portion 54*c* in the axial direction of the axis of the output shaft 26 and the location of the center 54*tc* of the toothed portion 54*t* of the output gear 54 in the widthwise direction of the toothed portion 54*t* are not the same location in the axial direction of the axis of the output shaft 26. In this modification of the fourth embodiment, when the operational load is applied from the electric motor 36 to the toothed portion 54*t* of the output gear 54 through the speed reducer 37, the force, which is applied to the connecting portion 54*c* at the actuator lever 27 side of the center 54*cc* in the axial direction of the axis of the output shaft 26, becomes larger than the force, which is applied to the connecting portion 54*c* at the other side of the center 54*cc*, which is opposite to the actuator lever 27. However, when a difference between the force applied to the actuator lever 27 side and the force applied to the opposite side is small, the toothed portion 54*t* and the connecting portion 54*c* will not tilt toward the actuator lever 27 side. Therefore, the location of the center 54*cc* of the connecting portion 54*c* in the axial direction of the axis of the output shaft 26 and the location of the center 54*tc* of the toothed portion 54*t* of the output gear 54 in the widthwise direction of the toothed portion 54*t* may not be the same location in the axial direction of the axis of the output shaft 26. However, in the case where the location of the center 54*cc* of the connecting portion 54*c* in the axial direction of the axis of the output shaft 26 and the location of the center 54*tc* of the toothed portion 54*t* of the output gear 54 in the widthwise direction of the toothed portion 54*t* of the output gear 54 are the same location in the axial direction of the axis of the output shaft 26, as shown in FIG. 13, the toothed portion 54*t* and the connecting portion 54*c* can be made more difficult to tilt.

Fifth Embodiment

Figure 15:
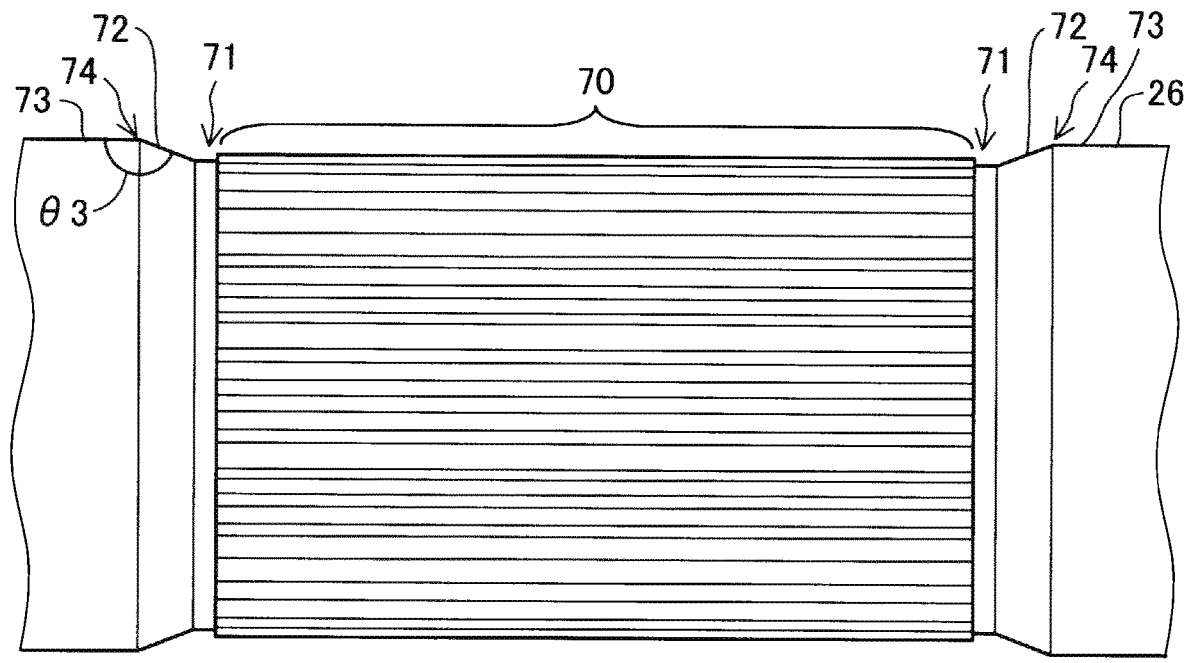
FIG. 15 is a magnified descriptive diagram indicating the surface-processed portion and its adjacent areas of the output shaft according to a fifth embodiment.

As shown in FIG. 15, the output shaft 26 includes a circumferential groove 71 at each of two opposite ends of the surface-processed portion 70, which are opposite to each other in the axial direction of the axis of the output shaft 26. Each circumferential groove 71 circumferentially extends along a circumference that has a diameter smaller than a recess diameter of the surface-processed portion 70. Here, the recess diameter is defined as a diameter of a circle that circumferentially connects corresponding ones of bottoms of the recesses among the series of the projections and recesses in the case where the series of projections and recesses are formed at the circumferential surface. Furthermore, the diameter of the circumferential groove 71 may be equal to the recess diameter. Therefore, the diameter of the circumferential groove 71 may be equal to or smaller than the recess diameter. The circumferential groove 71 has a straight portion that is parallel with the axial direction of the axis of the output shaft 26. Furthermore, the output shaft 26 includes a tapered portion 72 that is located on an opposite side of each circumferential groove 71, which is opposite to the surface-processed portion 70 in the axial direction of the axis of the output shaft 26. Each tapered portion 72 is tapered toward the surface-processed portion 70 in the axial direction of the axis of the output shaft 26. An angle 83, which is defined at a boundary 74 between the tapered portion 72 and a circumferential surface 73 of the output shaft 26, is an obtuse angle. With the above-described configuration, it is possible to increase the number of bonding surfaces between the output shaft 26 and the output gear 54 by forming the circumferential grooves 71. Thus, it is possible to increase an axial thrust receiving surface area, and thereby it is possible to reduce the stress applied to the axial thrust receiving surface. As a result, a pull-out strength against pulling out of the output shaft 26 from the output gear 54 can be improved. Furthermore, by providing the circumferential groove 71, which has the straight portion, and the tapered portion 72, it is possible to easily avoid contact between the outer diameter of the shaft and a cutting tool at the time of forming the surface-processed portion by cutting the output shaft 26, and thereby it is possible to process only the portion where the series of projections and recesses are formed. As a result, the quality of the shape of the surface-processed portion 70 and the fixing strength between the output shaft 26 and the output gear 54 can be improved, and the sensor accuracy for sensing the rotational angle can be improved. Here, it should be noted the circumferential grooves 71 and the tapered portions 72 may be omitted depending on a need.

Sixth Embodiment

As shown at the upper side in FIG. 16, it is preferred that the surface-processed portion 70 is continuous in axial direction of the axis of the output shaft 26. In this way, it is possible to increase the surface area for receiving the load. Thereby, the stress, which is applied to the surface-processed portion 70, can be reduced. However, as indicated at the lower side in FIG. 16, the surface-processed portion 70 may be formed at a plurality of locations, which are spaced from each other in the axial direction of the axis of the output shaft 26. In this way, the processing surface area can be reduced at the time of forming the surface-processed portion 70 through the cutting process.

Seventh Embodiment

Figure 17:
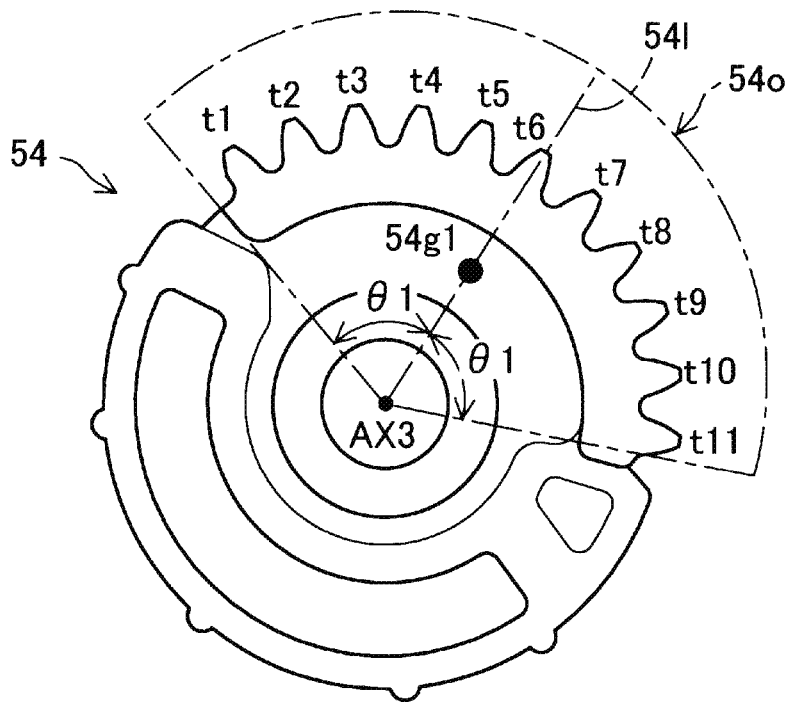
FIG. 17 is a descriptive diagram indicating the output gear and a gate trace according to a seventh embodiment.

As discussed with reference to FIG. 12, the output shaft 26 is placed at the molding dies 80, 82, and then the molten resin is filled into the cavity 81 through the gate 82*g* and is cured, so that the output shaft 26 and the output gear 54 are molded together into the integral structure (one piece). The location of the gate 82*g* at this time will be described. As shown in FIG. 17, the location of the gate 82*g* is left on the output gear 54 as a gate trace 54*g*1.

Next, the gate trace 54*g*1 formed at the time of resin molding of the output gear 54 will be described. As shown in FIG. 12, the molten resin is filled into the cavity 81 through the gate 82*g* that is formed at the molding die 82. Since the surface of the molding die 82 does not exist at the gate 82*g*, a trace of the gate is left on the resin. This trace is referred to as the gate trace 54*g*1. The gate trace 54*g*1 is a trace of a shape of the opening of the gate 82g on the surface of the output gear 54, i.e., is a remnant of the gate 82g.

As shown in FIG. 17, the output gear 54 has the gate trace 54g1 along a straight line 54l that bisects a central angle of an imaginary sector 54o, which receives all of the teeth 54t1-54t11 of the output gear 54 and is centered at the central axis AX3 of the output gear 54. The straight line 54l bisects the central angle of the imaginary sector 54o by θ1. A size 2θ1 (i.e., θ1+θ1) of the central angle of the imaginary sector 54o is less than 180 degrees, and θ1 is less than 90 degrees. Furthermore, as shown in FIG. 17, in the case where the number of the teeth 54t1-54t11 (in FIG. 17, the teeth 54t1-54t11 are simply indicated by t1-t11 for the sake of available space) of the output gear 54 is an odd number, the gate trace 54g1 is located along the straight line 54l that connects between the central axis AX3 of the output gear 54 and a tooth tip of a centered tooth 54t6, which is centered among the teeth 54t1-54t11 of the output gear 54. Alternatively, in a case where the number of the teeth of the output gear 54 is an even number, the gate trace 54g1 is located along a straight line that connects between the central axis AX3 of the output gear 54 and a bottom land located between centered two of the teeth of the output gear 54, which are circumferentially centered among the teeth of the output gear 54.

Figure 18:
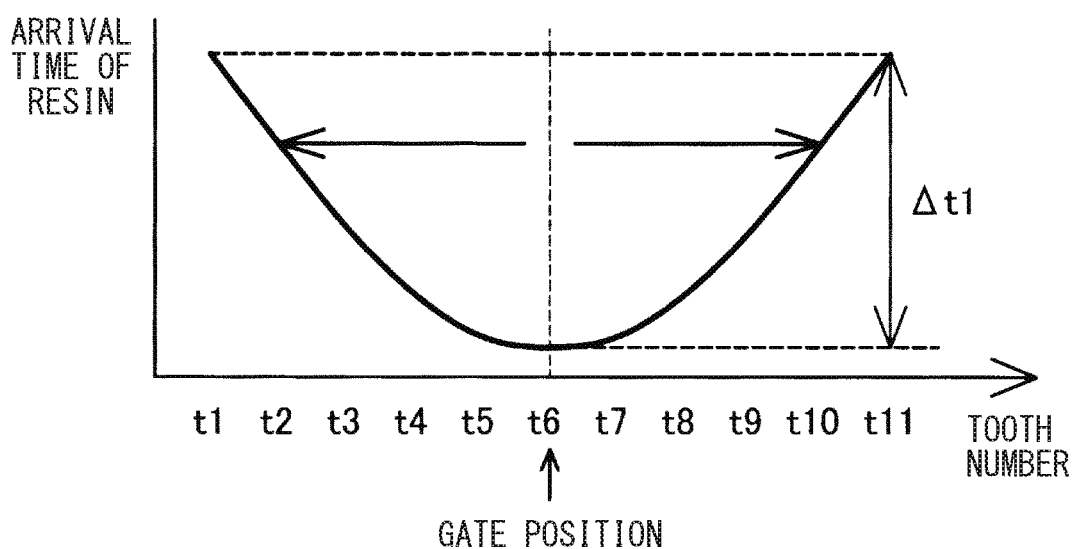
FIG. 18 is a descriptive diagram indicating a gate position and an arrival time of molten resin to a location of each of teeth of the output gear according to the seventh embodiment.
Figure 19:
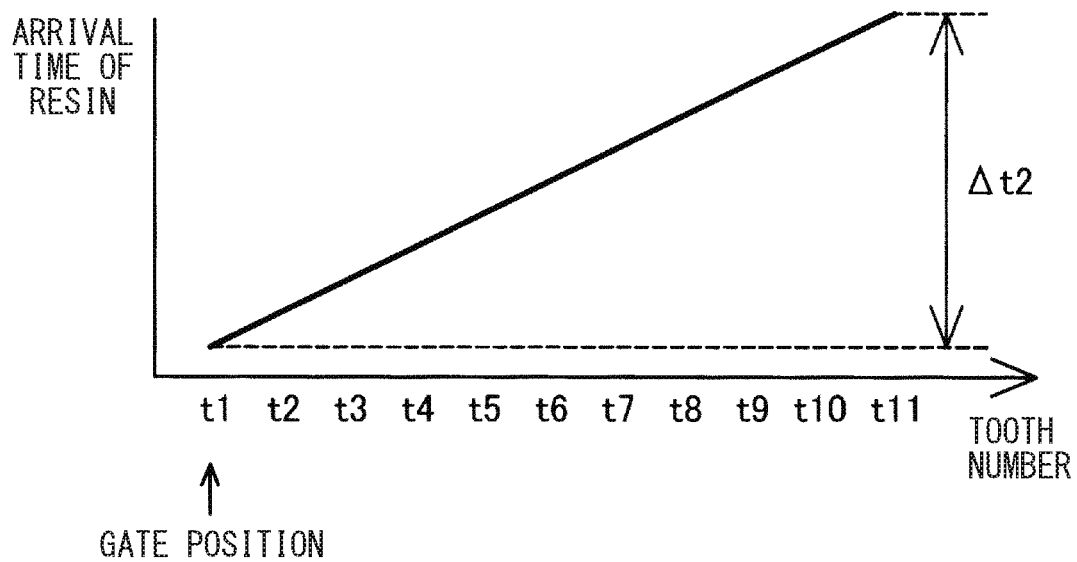
FIG. 19 is a descriptive diagram indicating a gate position and an arrival time of molten resin to a location of each of teeth of the output gear in a comparative example.

As shown in FIG. 18, in a case where the gate 82g (see FIG. 12) is radially placed between the tooth 54t6 and the central axis AX3, the molten resin, which is filled into the cavity 81, reaches the respective teeth in an order from the gate 82g side. Specifically, the molten resin first reaches the tooth 54t6. Then, the molten resin reaches the tooth 54t5 and the tooth 54t7 and finally reaches the tooth 54t1 and the tooth 54t11, which are farthest from the gate 82g after elapse of a time period Δt1 from a time point when the molten resin reaches the tooth 54t6. Furthermore, as shown in 19, in another case where the gate 82g (see FIG. 12) is radially placed between the tooth 54t1 and the central axis AX3, the molten resin, which is filled into the cavity 81, reaches the respective teeth in an order from the gate 82g side, i.e., the molten resin first reaches the tooth 54t1 and then reaches the tooth 54t2 and finally reaches the tooth 54t11, which is farthest from the gate 82g after elapse of a time period Δt2 from the time point when the molten resin reaches the tooth 54t1. At this time, there is a relationship of Δt2>Δt1. Therefore, in the case where the gate 82g is radially placed between the tooth 54t6 and the central axis AX3, the filling time, which is required to fill the molten resin to the respective teeth, can be reduced.

Figure 20:
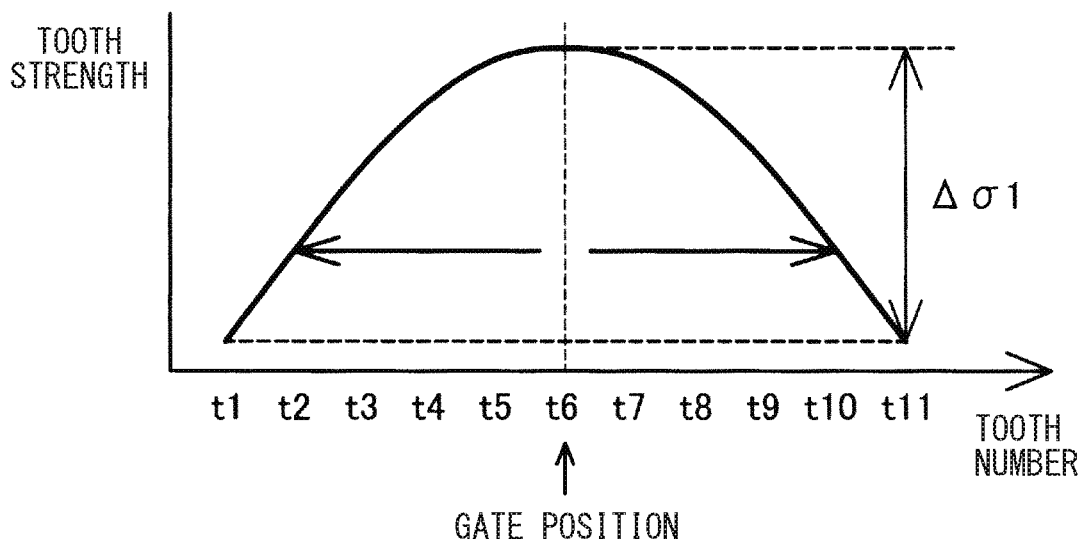
FIG. 20 is a descriptive diagram indicating the gate position and the strength of each of the teeth of the output gear according to the seventh embodiment.
Figure 21:
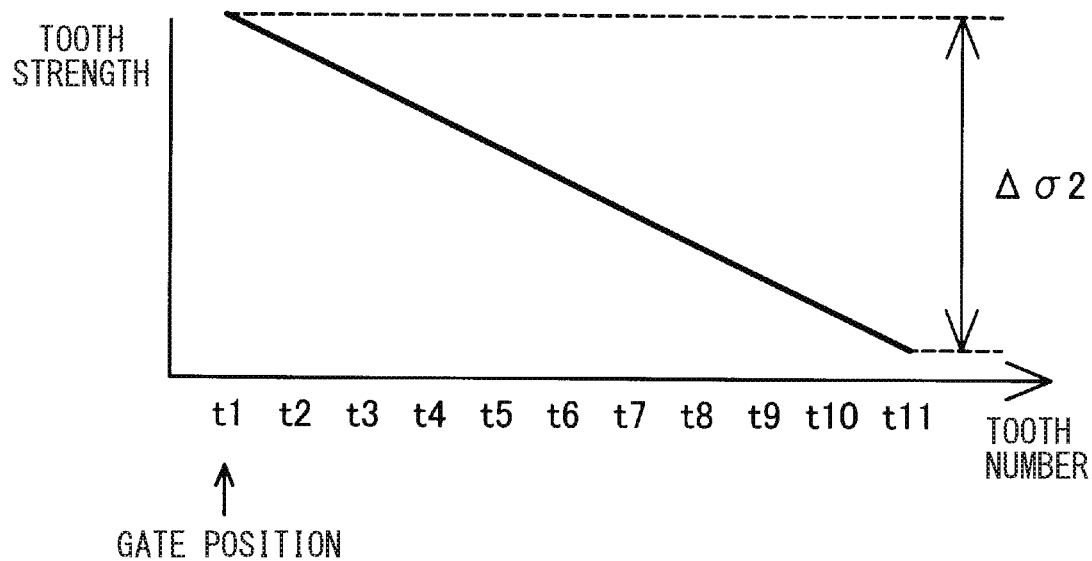
FIG. 21 is a descriptive diagram indicating the gate position and the strength of each of the teeth of the output gear in a comparative example.

Furthermore, in the case where the gate 82g is radially placed between the tooth 54t6 and the central axis AX3, the strengths of the teeth become such that the tooth 54t6 is the strongest, and the tooth 54t5 and the tooth 54t7 are the next strongest, and the tooth 54t1 and the tooth 54t11, which are farthest from the gate 82g, are the weakest, as shown in FIG. 20. Alternatively, in the case where the gate 82g is radially placed between the tooth 54t1 and the central axis AX3, the strengths of the teeth become such that the tooth 54t1 is the strongest, and the tooth 54t2 is the next strongest, and the tooth 54t11, which is farthest from the gate 82g, is the weakest, as shown in FIG. 21. Here, in the case where the gate 82g is radially placed between the tooth 54t6 and the central axis AX3, a difference between the strength of the strongest tooth and the strength of the weakest tooth is indicated by Δσ1. Furthermore, in the case where the gate 82g is radially placed between the tooth 54t1 and the central axis AX3, a difference between the strength of the strongest tooth and the strength of the weakest tooth is indicated by Δσ2. In such a case, Δσ1 is smaller than Δσ2. From the above result, it can be said that the faster the molten resin arrives, the stronger the tooth strength is. Furthermore, if the respective teeth are symmetrically arranged with respect to the position of the gate 82g, the difference in the strength among the teeth can be reduced, and the balance of the strength can be improved.

As described above, according to the present embodiment, the teeth 54t1-54t11 are symmetrically arranged about the straight line 54l that connects between the gate trace 54g1 and the central axis AX3. As a result, it is possible to reduce the difference in resin filling time between the left tooth and the right tooth, such as the tooth 54t1 and the tooth 54t11, which are symmetrically arranged about the straight line 54l, and thereby it is possible to reduce the difference in the strength among the teeth 54t1-54t11. The output gear 54 receives the force from the second small diameter external gear 63. At this time, in the output gear 54, the largest force is applied to the bottom lands, each of which is defined between adjacent two of the teeth 54t1-54t11 at the toothed portion 54t. According to the present embodiment, it is possible to limit generation of a weld line at the bottom lands. The weld line occurs at an area where two or more streams of the molten resin fuse together in the cavity 81 at the time of filling the molten resin. In general, the resin strength at the weld line is relatively low in comparison to the resin strength at the other locations other than the weld line. That is, according to the present embodiment, since the weld line can be eliminated from the bottom lands, at which the largest force is applied, or the inside of the imaginary sector 54o, the output gear 54 is hardly damaged. Here, it should be note that the gate trace 54g1 may not be placed along the straight line 54l, which bisects the central angle of the imaginary sector 54o that includes all of the teeth 54t1-54t11 of the output gear 54 and is centered at the central axis AX3 of the output gear 54, depending on a need.

Eighth Embodiment

Figure 22:
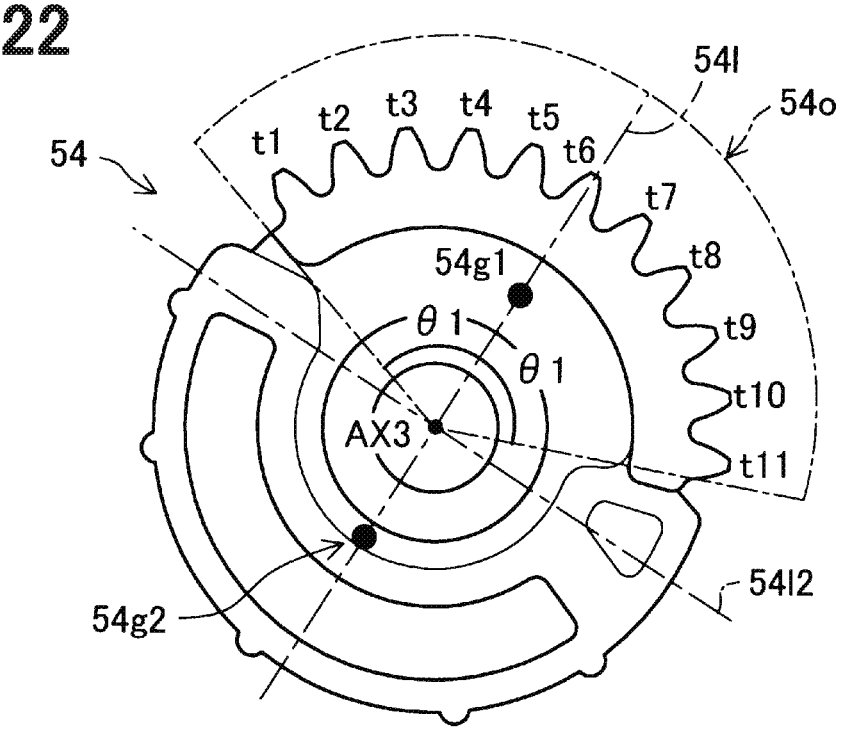
FIG. 22 is a descriptive diagram indicating an example where the number of the gate traces of the output gear is two according to an eighth embodiment.

Next, there will be described a case where the number of gates 82g is increased. In an example shown in FIG. 22, a first gate trace 54g1 and a second gate trace 54g2 are diametrically opposite to each other about the central axis AX3. Specifically, the second gate trace 54g2 is located at the outside of the imaginary sector 54o, which includes all of the teeth 54t1-54t11 of the output gear 54. In this example, a straight line 54l2, which bisects an angle defined between a line segment connecting the first gate trace 54g1 to the central axis AX3 of the output gear 54 and a line segment connecting the central axis AX3 of the output gear 54 to the second gate trace 54g2, is located at the outside of the central angle of the imaginary sector 54o that receives all of the teeth 54t1-54t11 of the output gear 54. The weld line is generated along the straight line 54l2. Furthermore, the straight line 54l2 does not extend over the teeth 54t1-54t11 of the output gear 54. Therefore, it is possible to limit the damage of the output gear 54.

Figure 23:
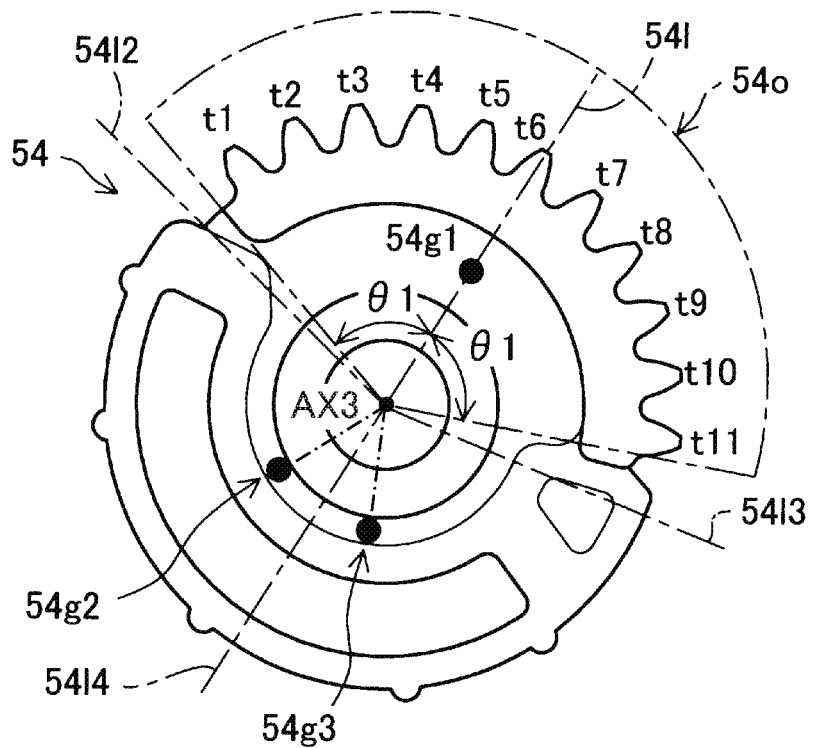
FIG. 23 is a descriptive diagram indicating another example where the number of the gate traces of the output gear is three according to the eighth embodiment.

In another example shown in FIG. 23, the second gate trace 54g2 and a third gate trace 54g3 are located at the outside of the imaginary sector 54o, which receives all of the teeth 54t1-54t11 of the output gear 54. In this example, a straight line 54l2, which bisects an angle defined between a line segment connecting the first gate trace 54g1 to the central axis AX3 of the output gear 54 and a line segment connecting the central axis AX3 of the output gear 54 to the second gate trace 54g2, is located at the outside of the central angle of the imaginary sector 54o that receives all of the teeth 54*t*1-54*t*11 of the output gear 54. Furthermore, a straight line 54*l*3, which bisects an angle defined between the line segment connecting the first gate trace 54*g*1 to the central axis AX3 of the output gear 54 and a line segment connecting the central axis AX3 of the output gear 54 to the third gate trace 54*g*3, is located at the outside of the central angle of the imaginary sector 54*o* that receives all of the teeth 54*t*1-54*t*11 of the output gear 54. The weld line is generated along the straight line 54*l*2 or the straight line 54*l*3. Furthermore, the straight line 54*l*2 does not extend over the teeth 54*t*1-54*t*11 of the output gear 54. Therefore, the strength of the output gear 54 can be increased. If a straight line 54*l*4, which bisects an angle defined between a line segment connecting the second gate trace 54*g*1 to the central axis AX3 of the output gear 54 and a line segment connecting the central axis AX3 of the output gear 54 to the third gate trace 54*g*3, extends in a direction, which is directed toward the central axis AX3, this straight line 54*l*4 extends over the one of the teeth 54*t*1-54*t*11 of the output gear 54. However, a weld line, which is generated by a stream of the molten resin filled through the gate corresponding to the second gate trace 54*g*2 and a stream of the molten resin filled through the gate corresponding to the third gate trace 54*g*3, is generated on an opposite side of the central axis AX3, which is opposite to the teeth 54*t*1-54*t*11 of the output gear 54. Therefore, the weld line is not formed to extend over any of the teeth 54*t*1-54*t*11 of the output gear 54. Therefore, it is possible to limit the damage of the output gear 54. In the eighth embodiment, the number of the gate traces is at least two. However, the number of the gate trace(s) may be one like in the seventh embodiment.

Ninth Embodiment

Figure 24:
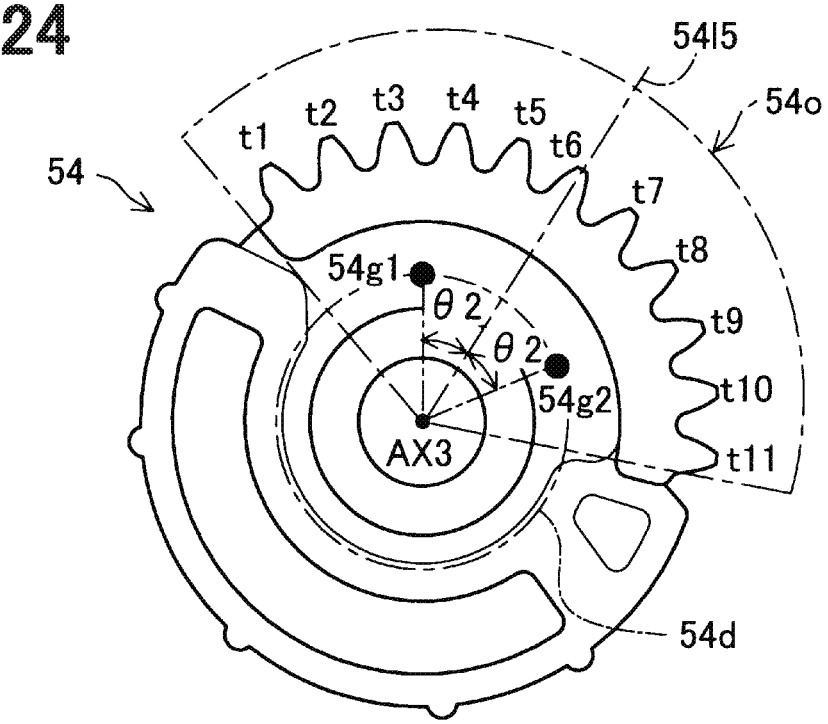
FIG. 24 is a descriptive diagram indicating an example where two gate traces are formed in a region between a central axis and the teeth of the output gear according to a ninth embodiment.

In another example shown in FIG. 24, two gate traces 54*g*1, 54*g*2 are located within the imaginary sector 54*o*, in which all of the teeth 54*t*1-54*t*11 of the output gear 54 are received. The first gate trace 54*g*1 and the second gate trace 54*g*2, which are circumferentially adjacent to each other, are located along a concentric circle 54*d* that is centered at the rotational center (the central axis AX3) of the output gear 54. Furthermore, a straight line 54*l*5, which bisects an angle 2θ2 (i.e., θ2+θ2) defined between a line segment connecting the first gate trace 54*g*1 to the central axis AX3 of the output gear 54 and a line segment connecting the central axis AX3 of the output gear 54 to the second gate trace 54*g*2, passes a tooth tip of one of the teeth 54*t*1-54*t*11 of the output gear 54, more specifically a tooth tip of the tooth 54*t*6. The weld line, which is formed by the molten resin filled through the gate corresponding to the first gate trace 54*g*1 and the molten resin filled through the gate corresponding to the second gate trace 54*g*2, is formed along the straight line 54*l*5. The straight line 54*l*5 passes the tooth tip of the one of the teeth 54*t*1-54*t*11 of the output gear 54. In other words, the straight line 54*l*5 does not pass any of the bottom lands, each of which is located between corresponding adjacent two of the teeth 54*t*1-54*t*11 of the output gear 54 and receives the largest force. Therefore, it is possible to limit the damage of the output gear 54. In the ninth embodiment, the number of the gate traces is at least two. However, the number of the gate trace(s) may be one like in the seventh embodiment. In the above embodiments, the respective gate traces 54*g*1, 54*g*2, 54*g*3 may not remain as the trace, which has for example, the corresponding shape, at the output gear 54. For example, even if the gate trace 54*g*1, 54*g*2, 54*g*3 is erased by, for example, a file (i.e., a tool having a series of ridges or points on its surfaces for reducing or smoothing surfaces of the resin), the eased locations still serve as the gate trace 54*g*1, 54*g*2, 54*g*3.

In each of the above embodiments, the actuator 10 of the present disclosure is described as the actuator 10 that opens and closes the wastegate valve 19, which controls the boost pressure of the supercharger. Alternatively, the actuator 10 of the present disclosure may be used for other purposes. For example, the actuator described in each of the above embodiments may be used as another type of actuator that is configured to control the boost pressure of the supercharger, such as an actuator, which drives a nozzle that changes a direction of the exhaust gas applied to a turbine of the supercharger 24, an actuator, which is for a twin-turbocharger or a two-stage turbocharger having two turbines and is configured to switch between the two turbines, or an actuator that is configured to switch a turbine of a variable-geometry turbocharger.

The present disclosure should not be limited to the above embodiments and may be implemented in various forms within a scope of the present disclosure. For example, the technical features of the respective embodiments, which correspond to the technical features of the aspects of the present disclosure recited in the summary section, may be appropriately replaced with another one or more technical features or may be combined with the technical features of the other embodiment(s) to achieve a portion or all of the objective(s) or to achieve a portion of all of the advantages discussed above. Further, if the technical feature(s) is not described as essential in the present specification, it may be eliminated as appropriate.

The present disclosure may be implemented in the following manner.

(1) According to one aspect of the present disclosure, there is provided an actuator configured to drive a boost pressure control valve of a supercharger. The actuator includes: an electric motor; an output shaft that is coupled to the boost pressure control valve through a linkage mechanism; and a speed reducer that is configured to transmit rotation, which is outputted from the electric motor, to the output shaft after reducing a speed of the rotation outputted from the electric motor. The speed reducer has a plurality of gears that include an output gear joined to the output shaft. The output shaft is made of metal. The output gear is made of resin. The output shaft has a surface-processed portion that has a series of projections and recesses and is formed at a portion of an outer peripheral surface of the output shaft. The output gear includes: a fixing portion that is joined to the surface-processed portion; a connecting portion that connects between a toothed portion of the output gear and the fixing portion with the resin while the toothed portion includes a plurality of teeth; and a magnetic circuit device that is provided to sense a rotational position of the output gear. A length, which is measured from a center of a boundary surface between the connecting portion and the fixing portion in an axial direction of an axis of the output shaft to one end part of a joint between the surface-processed portion and the fixing portion on the linkage mechanism side along the joint, is indicated by L1. A length, which is measured along the joint from the center of the boundary surface to an opposite end part of the joint that is opposite to the linkage mechanism in the axial direction of the axis of the output shaft, is indicated by L2. A relationship of L1>L2 is satisfied.

(2) In the above aspect, the output gear may have the magnetic circuit device on an opposite side of the output shaft, which is diametrically opposite to the toothed portion.

According to this aspect, the force is not applied to the opposite side, which is diametrically opposite to the toothed portion about the output shaft, so that the sensing accuracy of the rotational position of the output gear can be improved.

(3) In the above aspect, the fixing portion may have a stepped form where a radial thickness of one end side of the fixing portion, which is located on the linkage mechanism side of a center part of the fixing portion in the axial direction of the axis of the output shaft, is smaller than a radial thickness of the center part of the fixing portion. According to the above aspect, in the case where the fixing portion has the stepped form where the radial thickness of the one end side of the fixing portion is smaller than the radial thickness of the center part of the fixing portion, the surface-processed portion can be lengthened toward the actuator lever side while avoiding an interference between the output gear and its mating gear without increasing a size of the actuator. Therefore, it is possible to increase a ratio of the length L1 relative to the length L2, and thereby it is possible to improve the stress reducing effect.

(4) In the above aspect, an end part of the fixing portion, which is located on the linkage mechanism side in the axial direction of the axis of the output shaft, may be shaped in a tapered form where a radial thickness of the end part of the fixing portion is progressively decreased toward the linkage mechanism in the axial direction of the axis of the output shaft. In the case where the tapered form of this aspect is formed, the shape of the molding die, which forms this tapered form, enables easy insertion of the output shaft at the time of placing the output shaft at the molding die of the injection molding machine, which is used to mold the output gear. Specifically, the installation of the output shaft into the molding die is eased, and the installation of the output shaft into the molding die can be reliably performed. Furthermore, in the case where the end part of the fixing portion is shaped in the tapered form, the amount of resin used for molding the output gear can be reduced or minimized.

(5) In the above aspect, in the axial direction of the axis of the output shaft, a location of the center of the connecting portion, which is centered at the connecting portion in the axial direction of the axis of the output shaft, may be the same as a location of a center of the toothed portion of the output gear, which is centered at the toothed portion of the output gear in a widthwise direction of the toothed portion that coincides with the axial direction of the axis of the output shaft. In a case where the location of the center of the connecting portion and the location of the center of the toothed portion are different from each other in the axial direction, a momentum is generated at the toothed portion relative to the center of the connecting portion, so that the toothed portion may be tilted in the axial direction. When the toothed portion is tilted in the axial direction in this way, the connecting portion and the fixing portion, which are connected with each other, may be deformed. Thus, the stress may be concentrated at the surface-processed portion. As in the above aspect, in the case where the location of the center of the connecting portion, which is centered at the connecting portion in the axial direction of the axis of the output shaft, is the same as the location of the center of the toothed portion of the output gear, it is possible to limit the tilting of the toothed portion in the axial direction, which is caused by the generation of the moment at the toothed portion relative to the center of the connecting portion.

(6) In the above aspect, the output shaft may include: a circumferential groove that is located at an end part of the surface-processed portion in the axial direction of the axis of the output shaft and circumferentially extends along a circumference that has a diameter, which is equal to or smaller than a recess diameter of the surface-processed portion, which is a diameter of a circle that circumferentially connects bottoms of corresponding ones of the recesses among the series of projections and recesses, wherein the circumferential groove has a straight part that is parallel with the axial direction of the axis of the output shaft; and a tapered portion that is located on an opposite side of the circumferential groove, which is opposite to the surface-processed portion in the axial direction of the axis of the output shaft, wherein the tapered portion is tapered toward the surface-processed portion in the axial direction of the axis of the output shaft. According to this aspect, the number of joint surfaces between the end surface of the surface-processed portion and the resin is increased, so that the axial thrust receiving surface area is increased. As a result, the pull-out strength against pulling out of the output shaft from the output gear can be improved by reducing the stress at the axial thrust receiving surface. In the case where the straight portion and the taper are formed, at the time of forming the surface-processed portion, only the desired portion of the output shaft, at which the surface processing is performed, can be processed while easily avoiding the contact between the outer diameter of the shaft and a cutting tool. As a result, the quality of the shape of the surface-processed portion and the fixing strength between the output shaft and the output gear can be improved, and the sensor accuracy for sensing the rotation angle can be improved.

(7) In the above aspect, the surface-processed portion may be formed continuously in the axial direction of the axis of the output shaft. According to this aspect, it is possible to increase a surface area for receiving the load in comparison to a case where the surface-processed portion is divided at a plurality of axial locations. As a result, the stress reducing effect of the surface-processed portion can be improved.

(8) In the above aspect, the output gear may have a gate trace that is a trace formed at a time of injecting the resin during injection molding of the output gear, and the gate trace may be located along a straight line that bisects a central angle of an imaginary sector, which receives all of the plurality of teeth of the output gear and is centered at a central axis of the output gear. According to this aspect, the teeth of the output gear are symmetrically arranged about the line, which connects between the gate trace and the central axis. Therefore, it is possible to reduce a difference in the filling time for filling the resin into the respective teeth of the output gear, and thereby it is possible to reduce a difference in the strength among the teeth of the output gear. Furthermore, the weld line, which is formed by the resin filled in a manner that generates the above described gate trace, does not pass any of the bottom lands of the output gear, at each of which the largest force is applied in the output gear. Therefore, it is possible to limit the damage of the output gear.

(9) In the above aspect, the gate trace may be a first gate trace, and the output gear may include a second gate trace while the second gate trance is placed to satisfy a condition that a straight line, which bisects an angle defined between a line segment connecting the first gate trace to the central axis of the output gear and a line segment connecting the central axis of the output gear to the second gate trace, is located at an outside of the central angle of the imaginary sector, which receives all of the plurality of teeth of the output gear. According to this aspect, when the center line between the gate trances is located at the outside of the angular range, in which the teeth of the output gear are located, the weld line of the output gear is not located within the angular range, in which the teeth of the output gear are located. Specifically, the weld line, which is formed by the resin filled in a manner that generates the above described gate trace, does not pass any of the bottom lands of the output gear, at each of which the largest force is applied in the output gear. Therefore, it is possible to limit the damage of the output gear.

(10) In the above aspect, the number of the plurality of teeth of the output gear may be an odd number or an even number. When the number of the plurality of teeth of the output gear is the odd number, the gate trace may be located along a straight line that connects between the central axis of the output gear and a tooth tip of one of the plurality of teeth of the output gear. When the number of the plurality of teeth of the output gear is the even number, the gate trace may be located along a straight line that connects between a rotational center of the output gear and a bottom land while the bottom land is located between adjacent two of the plurality of teeth of the output gear. According to this aspect, the weld line, which is formed by the molten resin filled in a manner that generates the above described gate trace, does not pass any of the bottom lands of the output gear, at each of which the largest force is applied in the output gear. Therefore, it is possible to limit the damage of the output gear.

(11) In the above aspect, the output gear may have at least two gate traces, each of which is a trace formed at a time of injecting the resin during injection molding of the output gear. The at least two gate traces may be located along a concentric circle that is centered at a rotational center of the output gear. The at least two gate traces may include a first gate trace and a second gate trace that are circumferentially adjacent to each other among the at least two gate traces. A straight line, which bisects an angle defined between a line segment connecting the first gate trace to the central axis of the output gear and a line segment connecting the central axis of the output gear to the second gate trace, may pass a tooth tip of one of the plurality of teeth of the output gear. According to this aspect, the weld line, which is formed by the molten resin filled in a manner that generates the above described gate traces, does not pass any of the bottom lands of the output gear, at each of which the largest force is applied in the output gear. Therefore, it is possible to limit the damage of the output gear.

The present disclosure can be implemented in various other forms. For example, besides the actuator, which is configured to open and close the waste gate valve of the turbocharger, the present disclosure may be implemented as another type of actuator that is configured to control the boost pressure of the supercharger, such as an actuator, which is for a twin-turbocharger having two turbines and is configured to switch between the two turbines, or an actuator that is configured to switch a turbine of a variable-geometry turbocharger.

What is claimed is:

1. An actuator configured to drive a boost pressure control valve of a supercharger, the actuator comprising:
   an electric motor;
   an output shaft that is coupled to the boost pressure control valve through a linkage mechanism; and
   a speed reducer that is configured to transmit rotation, which is outputted from the electric motor, to the output shaft after reducing a speed of the rotation outputted from the electric motor, wherein:
   the speed reducer has a plurality of gears that include an output gear joined to the output shaft;
   the output shaft is made of metal;
   the output gear is made of resin;
   the output shaft has a surface-processed portion that has a series of projections and recesses and is formed at a portion of an outer peripheral surface of the output shaft;
   the output gear includes:
      a fixing portion that is joined to the surface-processed portion;
      a connecting portion that connects between a toothed portion of the output gear and the fixing portion with the resin while the toothed portion includes a plurality of teeth; and
      a magnetic circuit device that is provided to sense a rotational position of the output gear;
   a length, which is measured from a center of a boundary surface between the connecting portion and the fixing portion in an axial direction of an axis of the output shaft to one end part of a joint between the surface-processed portion and the fixing portion on the linkage mechanism side along the joint, is indicated by L1;
   a length, which is measured along the joint from the center of the boundary surface to an opposite end part of the joint that is opposite to the linkage mechanism in the axial direction of the axis of the output shaft, is indicated by L2; and
   a relationship of L1>L2 is satisfied.

2. The actuator according to claim 1, wherein the output gear has the magnetic circuit device on an opposite side of the output shaft, which is diametrically opposite to the toothed portion.

3. The actuator according to claim 1, wherein the fixing portion has a stepped form where a radial thickness of one end side of the fixing portion, which is located on the linkage mechanism side of a center part of the fixing portion in the axial direction of the axis of the output shaft, is smaller than a radial thickness of the center part of the linkage mechanism.

4. The actuator according to claim 1, wherein an end part of the fixing portion, which is located on the linkage mechanism side in the axial direction of the axis of the output shaft, is shaped in a tapered form where a radial thickness of the end part of the fixing portion is progressively decreased toward the linkage mechanism in the axial direction of the axis of the output shaft.

5. The actuator according to claim 1, wherein in the axial direction of the axis of the output shaft, a location of the center of the connecting portion, which is centered at the connecting portion in the axial direction of the axis of the output shaft, is the same as a location of a center of the toothed portion of the output gear, which is centered at the toothed portion of the output gear in a widthwise direction of the toothed portion that coincides with the axial direction of the axis of the output shaft.

6. The actuator according to claim 1, wherein the output shaft includes:
   a circumferential groove that is located at an end part of the surface-processed portion in the axial direction of the axis of the output shaft and circumferentially extends along a circumference that has a diameter, which is equal to or smaller than a recess diameter of the surface-processed portion, which is a diameter of a circle that circumferentially connects bottoms of corresponding ones of the recesses among the series of projections and recesses, wherein the circumferential groove has a straight part that is parallel with the axial direction of the axis of the output shaft; and
   a tapered portion that is located on an opposite side of the circumferential groove, which is opposite to the surface-processed portion in the axial direction of the axis of the output shaft, wherein the tapered portion is tapered toward the surface-processed portion in the axial direction of the axis of the output shaft.

7. The actuator according claim 1, wherein the surface-processed portion is formed continuously in the axial direction of the axis of the output shaft.

8. The actuator according claim 1, wherein:
the output gear has a gate trace that is a trace formed at a time of injecting the resin during injection molding of the output gear; and
the gate trace is located along a straight line that bisects a central angle of an imaginary sector, which receives all of the plurality of teeth of the output gear and is centered at a central axis of the output gear.

9. The actuator according to claim 8, wherein:
the gate trace is a first gate trace; and
the output gear includes a second gate trace while the second gate trance is placed to satisfy a condition that a straight line, which bisects an angle defined between a line segment connecting the first gate trace to the central axis of the output gear and a line segment connecting the central axis of the output gear to the second gate trace, is located at an outside of the central angle of the imaginary sector, which receives all of the plurality of teeth of the output gear.

10. The actuator according to claim 8, wherein:
the number of the plurality of teeth of the output gear is an odd number or an even number;
when the number of the plurality of teeth of the output gear is the odd number, the gate trace is located along a straight line that connects between the central axis of the output gear and a tooth tip of one of the plurality of teeth of the output gear; and
when the number of the plurality of teeth of the output gear is the even number, the gate trace is located along a straight line that connects between a rotational center of the output gear and a bottom land while the bottom land is located between adjacent two of the plurality of teeth of the output gear.

11. The actuator according to claim 1, wherein:
the output gear has at least two gate traces, each of which is a trace formed at a time of injecting the resin during injection molding of the output gear;
the at least two gate traces are located along a concentric circle that is centered at a rotational center of the output gear;
the at least two gate traces include a first gate trace and a second gate trace that are circumferentially adjacent to each other among the at least two gate traces; and
a straight line, which bisects an angle defined between a line segment connecting the first gate trace to the central axis of the output gear and a line segment connecting the central axis of the output gear to the second gate trace, passes a tooth tip of one of the plurality of teeth of the output gear.

* * * * *